US007167259B2

(12) United States Patent
Varga

(10) Patent No.: US 7,167,259 B2
(45) Date of Patent: Jan. 23, 2007

(54) SYSTEM AND METHOD FOR MERGING LINE WORK OBJECTS USING TOKENIZATION AND SELECTIVE COMPRESSION

(75) Inventor: John Thomas Varga, Longmont, CO (US)

(73) Assignee: International Business Machines Corporation, Armonk, NY (US)

( * ) Notice: Subject to any disclaimer, the term of this patent is extended or adjusted under 35 U.S.C. 154(b) by 809 days.

(21) Appl. No.: 09/858,271

(22) Filed: May 15, 2001

(65) Prior Publication Data

US 2001/0055124 A1    Dec. 27, 2001

Related U.S. Application Data

(60) Provisional application No. 60/204,608, filed on May 16, 2000.

(51) Int. Cl.
 *G06F 3/12* (2006.01)
(52) U.S. Cl. .............................. 358/1.15; 358/426.13; 358/1.9; 358/1.18; 382/232; 382/233; 382/235; 382/245; 382/246; 382/243; 345/555
(58) Field of Classification Search ............... 358/1.15, 358/426.13, 1.9, 1.18; 382/232, 233, 235, 382/244, 245, 246, 238, 239, 243; 345/555, 345/467, 418; 386/33
See application file for complete search history.

(56) References Cited

U.S. PATENT DOCUMENTS 5,202,672 A * 4/1993 Nakamura et al. ......... 345/467

5,535,290 A    7/1996 Allen
5,710,719 A *  1/1998 Houle ......................... 382/232
5,774,078 A    6/1998 Tanaka et al.

(Continued)

FOREIGN PATENT DOCUMENTS

JP    7-106979    4/1995

OTHER PUBLICATIONS

D. Butterfield, "High Quality High Compression 8-Bit Digital Video," IBM Technical Disclosure Bulletin, vol. 36, No. 06B, Jun. 1993, pp. 401-404.

(Continued)

*Primary Examiner*—King Y. Poon
*Assistant Examiner*—Beniyam Menberu
(74) *Attorney, Agent, or Firm*—David W. Lynch; Chambliss, Bahner & Stophel P.C.

(57) ABSTRACT

A method, apparatus, and information bearing medium for merging display items in encoded form involve providing display items to be merged in an encoded format, such as a run length encoded format (e.g., modified enhanced run length encoded format). The display items are examined on the basis of item priority. A target item having a target area is defined. The display items in the target area are merged according to item priority to produce the target item. The target item is representative of the merged display items. The encoded data associated with the display items to be merged includes control data and color data. In one embodiment, tokens are produced using the encoded data associated with the display items to be merged. The display items are merged using the tokens. The tokens represent counts of repeated data or pointers to pass-thru data associated with the display items to be merged.

18 Claims, 16 Drawing Sheets

U.S. PATENT DOCUMENTS

| | | | |
|---|---|---|---|
| 5,777,749 A * | 7/1998 | Noda et al. | 382/239 |
| 5,801,716 A | 9/1998 | Silverbrook | |
| 5,864,342 A * | 1/1999 | Kajiya et al. | 345/418 |
| 5,886,701 A | 3/1999 | Chauvin et al. | |
| 5,886,707 A | 3/1999 | Berg | |
| 5,905,502 A | 5/1999 | Deering | |
| 5,949,427 A | 9/1999 | Nishikawa et al. | |
| 5,977,977 A | 11/1999 | Kajiya et al. | |
| 5,978,553 A | 11/1999 | Ikeda | |
| 5,982,937 A | 11/1999 | Accad | |
| 5,991,515 A * | 11/1999 | Fall et al. | 358/1.15 |
| 5,999,189 A | 12/1999 | Kajiya et al. | |
| 5,999,710 A * | 12/1999 | Smith et al. | 358/1.15 |
| 6,006,013 A * | 12/1999 | Rumph et al. | 358/1.15 |
| 6,014,133 A | 1/2000 | Yamakado et al. | |
| 6,028,961 A | 2/2000 | Shimomoura | |
| 6,035,070 A * | 3/2000 | Moon et al. | 382/243 |
| 6,049,390 A * | 4/2000 | Notredame et al. | 358/1.15 |
| 6,078,694 A * | 6/2000 | Takahashi et al. | 382/238 |
| 6,215,558 B1 * | 4/2001 | Kubota | 358/1.15 |
| 6,298,164 B1 * | 10/2001 | Suzuki et al. | 382/245 |
| 6,314,209 B1 * | 11/2001 | Kweon et al. | 382/243 |
| 6,330,072 B1 * | 12/2001 | Barada et al. | 358/1.18 |
| 6,526,214 B2 * | 2/2003 | Maertens | 386/33 |
| 6,804,411 B1 * | 10/2004 | Hanna | 382/276 |
| 6,961,134 B1 * | 11/2005 | Hanna | 358/1.1 |

OTHER PUBLICATIONS

"Apparatus And Associate Method For Compression/Decompression of Color Digital Information,"IBM Technical Disclosure Bulletin, vol. 40, No. 09, Sep. 1997, pp. 43-44.

Concurrent PostScript Rasterizers Based High Throughput Color Printer Architecture, IBM Technical Disclosure Bulletin, vol. 40, No. 03, Mar. 1997, pp. 141-150.

Mitra et al., "Efficient Color Image Compression Using Integrated Fuzzy Neural Networks For Vector Quantization," Texas Tech University, Dept. of Electrical Engineering, IEEE 1997, pp. 184-188.

Dyck et al., "Subband/VQ Coding of Color Images With Perceptually Optimal Bit Allocation," IEEE Transactions on Circuits And Systems For Video Technology, vol. 4, No. 1, Feb. 1994, pp. 68-81.

* cited by examiner

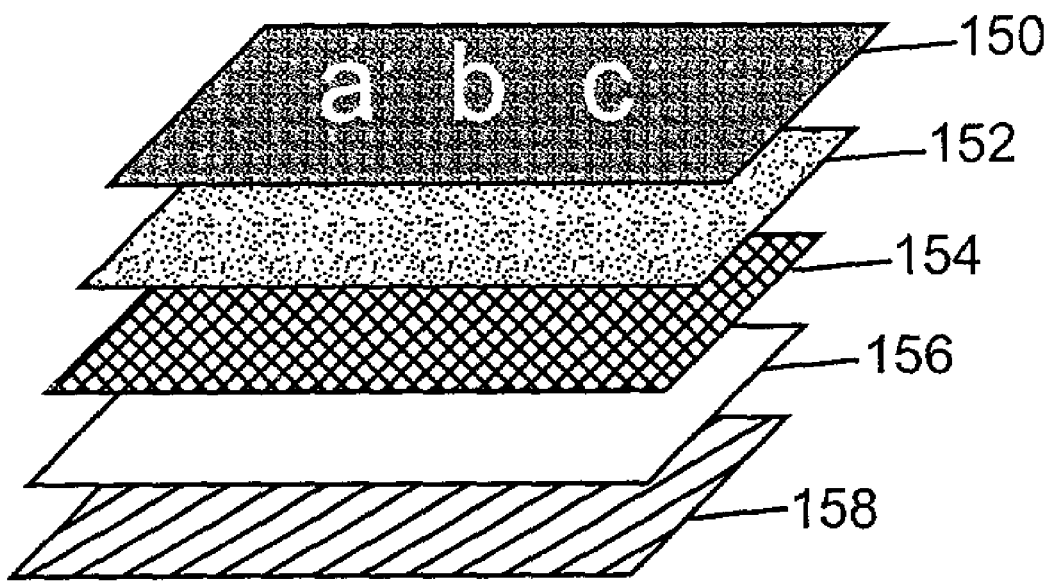
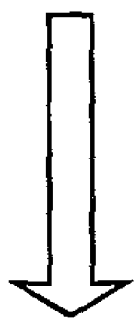
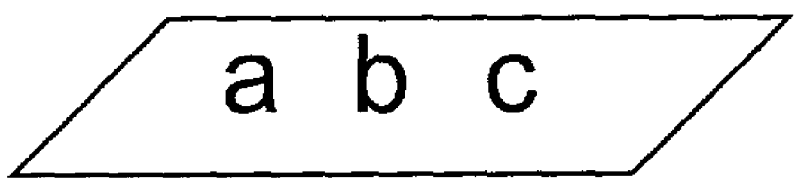
Fig. 2

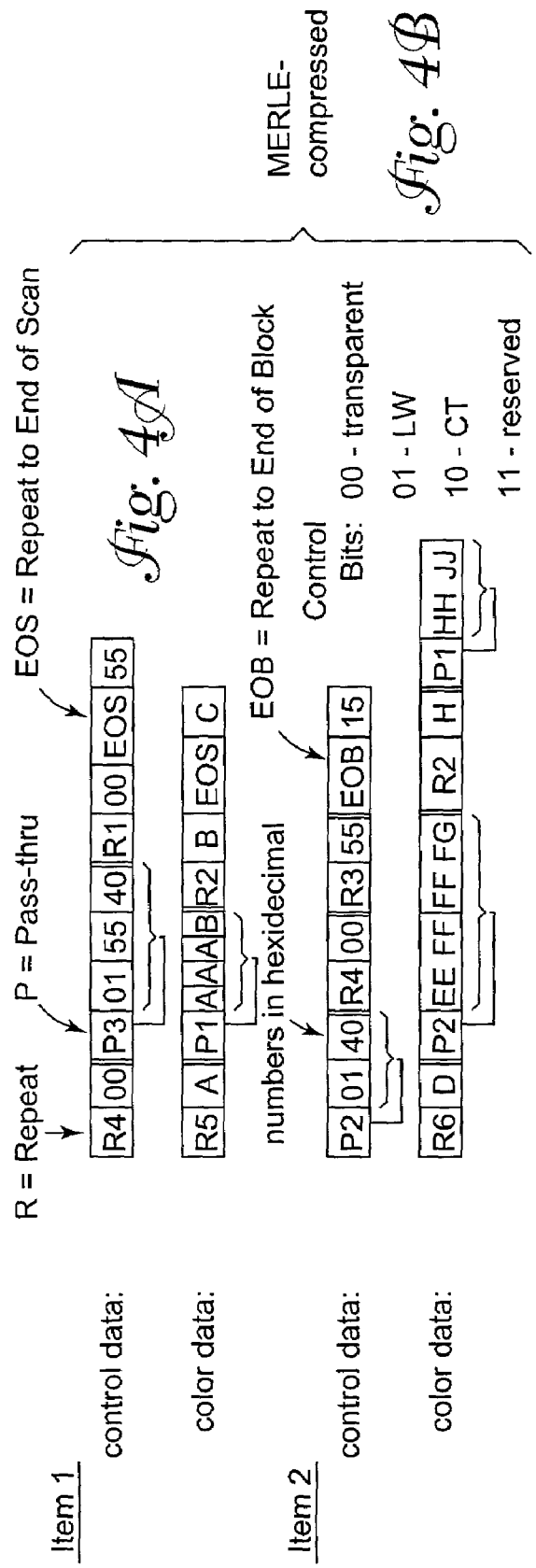

Fig. 4C
Item 1 control: [      |      |      |      |      | •  • • | •    ]
Item 1 data:    [ AAAA | AAAA | AAAA | AAAB | BBBB | BBBB | CCCC ]
↳ Item 1 starts here Fig. 4D
Item 2 control: [ •    | •    |      |      |      | •  • • |      ]
Item 2 data:    [ DDDD | DDDD | DDDD | DDDD | EE FF | FF FG | HHHH | HHHH | HH JJ ]
↳ Item 2 starts here Fig. 4E
Merged control: [ •    | •    |      |      |      | •  • • |      ]
Merged data:    [ DDDD | DDDD | DDDD | DDDD | AAAA | AAAB | BF FG | HHHH | CCCC | HH JJ ]

(Item 1 has higher priority)                    • Denotes non-transparent

Raster (uncompressed)

Fig. 4F

Merged (Target)
control data: [ P2 | 01 | 40 | R3 | 00 | P1 | 01 | R4 | 55 | P1 | 15 ]
color data:   [ R5 | D | R1 | A | P2 | AA | AB | BF | FG | R1 | H | R1 | C | P1 | HH JJ ]

} MERLE-compressed

Merge code

Fetch data code (for item) Aligns token to 4-pixel boundaries in target

Get token code (for item)

SYSTEM AND METHOD FOR MERGING LINE WORK OBJECTS USING TOKENIZATION AND SELECTIVE COMPRESSION

RELATED APPLICATIONS

This application claims the benefit of U.S. Provisional Application 60/204,608 filed May 16, 2000, which is hereby incorporated herein by reference.

CROSS-REFERENCE TO RELATED APPLICATIONS

This application is related to the following commonly-assigned patent applications, all of which are filed on May 16, 2000, and all of which are hereby incorporated herein by reference in their respective entireties:

"Color Image Data and Control Bit Compression Scheme with Run Length Encoding," to Jean M. Aschenbrenner, Stephen D. Hanna, and John T. Varga, having U.S. Pat. No. 6,721,456;

"Method, System, Program, and Data Structure for Generating Raster Objects," to Jean M. Aschenbrenner, Christopher Kush, and John T. Varga, having U.S. Pat. application Ser. No. 09/569,777;

"Method, System, and Logic for Selecting Line Work and Control Data for a Pixel from Multiple Objects of Line Work Data Provided for the Pixel" to David E. Finlay and Phillip K. Hoskins, having U.S. patent application Ser. No. 09/570,211;

"System and Method for Optimizing Color Compression Using Transparency Control Bits," to John T. Varga, having U.S. patent application Ser. No. 09/571,519; and "System and Method for Compressing Color Data Using Expandable Color Palette," to John Varga, having U.S. patent application Ser. No. 09/571,790.

FIELD OF THE INVENTION

The present invention relates generally to data compression schemes and, more particularly, to compression schemes involving merging of multiple objects.

BACKGROUND OF THE INVENTION

To print an image, a print engine processor, referred to herein as a raster image processor, converts the image in a page description language or vector graphics format to a bit mapped image indicating a value to print at each pixel of the image. The bit mapped image is sent to the printer to cause the print heads to print the specified color value at the pixel according to the information in the bit map. If a printer has multiple print heads, such as a print head for different colors, then bitmaps are generated for each print head. The print heads overlay the images defined by their respective bitmaps onto the print medium.

To produce the bitmaps for the print heads, the raster image processor performs numerous transformations on a print image, which may include different types of data, such as line art, e.g., text and graphics, and continuous tone (contone), e.g., images. The raster image processor usually performs operations such as data compression, color space conversion, and halftoning when generating the raster bit map to print. After dissecting a print image into different components, such as color components, text art, contone, images, etc., the raster image processor must then merge the different elements together so that the original image, previously split into different components, is reconstructed for the color plane process.

As newer printers print at ever higher resolutions and speeds, the amount of data needed to generate the print job correspondingly increases. One of the major limitations in increasing printer speed is the time required to rasterize print data, especially the time required by the raster image processor to break an image into different object components and then reassemble, screen and merge those components into a final bitmap image.

Printer systems have a series of hardware and software operations through which digital data passes in preparation for printing, referred to as a pipeline. The digital data is used by a print engine to form a print image on a print surface using, for examples, a scanning laser beam or an inkjet. An area of the print surface on which the image is formed is referred to as a picture element (pel or pixel). One scan of the laser beam across the print surface forms a row of pixels, referred to as a scan row. As such, the print image is formed with multiple scan rows.

The type of data that passes through the pipeline may include both text, graphics, and image. As printers increase the density of dot placements, particularly with color printing that requires additional bits per pixel over monochrome printing, the time required for the printer's data pipeline to transmit the data becomes substantial. To fully utilize the increasing print speed capabilities of print engines, the pipeline of a printer system must be able to transfer data sufficiently fast to supply a continuous stream of data to the print engine, thereby allowing the print engine to print continuously.

Printer systems typically use data compression and decompression techniques to reduce data size, such that data may be transmitted faster through a printer's pipeline. Data compression refers to a process that attempts to convert data in a given format into an alternative format requiring less space than the original. As such, data compression systems effect a savings in the amount of storage required to hold, or the amount of time required to transmit, a given body of digital information.

In accordance with a known compression method, referred to as run length encoding, the length of continuous identical pixel data is converted into a run length code for transmission. For example, using one run length compression method, the pixel data line "aaaabbbbbbbcccccdd" is converted into the coded data "a4b7c5d2." The coded data consists of bytes of pixel information (a, b, c, and d) and the number of those bytes that are the same (4, 7, 5, and 2). Each byte in this illustrative example contains 8 bits of pixel information.

Such a byte-based compression method may still not provide enough reduction in storage space or transmit time that may be required by current print engines. Also, conventional compression methods may not be targeted to handle multiple bits/pixel. Further, prior compression methods may not be efficient in terms of compressing color data.

Thus, there is a need in the art to provide an improved method, system, and program to transform print data, such as text, vector graphics, images and raster data, into a final rasterized bitmaps in a more timely manner to increase printer throughput. The present invention fulfills these and other needs.

SUMMARY OF THE INVENTION

The present invention is directed to a method, system, and processor-readable medium for merging display items in an encoded format. According to an embodiment of the present invention, a number of display items to be merged are provided in an encoded format, such as a run length encoded format (e.g., modified enhanced run length encoded format). The display items are examined on the basis of item priority. A target item having a target area is defined. The display items in the target area are merged according to item priority to produce the target item. The target item is representative of the merged display items.

The encoded data associated with the display items to be merged includes control data and color data. The control and color data include at least some of repeat data, pass-thru data, an end of scan code, and an end of block code.

Examining the display items involves examining a display item of highest priority and examining display items of lower priority to completely fill in the target item as a function of transparency of the highest priority display item. For example, a display item of highest priority (overlaying display item) is examined and underlying display items of lower priority are examined at positions where control data of the overlaying display item indicates transparency. Skipping data at particular locations of lower priority display items occurs when corresponding locations of higher priority display items are non-transparent. Merging the display items advantageously involves using transparency control data associated with the display items so that data associated with the display items is read only once, thereby increasing processing efficiency and throughput.

The target area associated with the target item extends from a leftmost pixel of a leftmost display item to a rightmost pixel of a rightmost display item for the display items being merged. The target area also includes padding. For example, the display items being merged typically include up to five ranges within the target area. These five ranges include: left padding of multiples of 4 pixels, a transition defined across 4 pixels from the padding to the display item to be merged, mid-object pixels (consisting of multiples of 4 pixels), a transition defined across 4 pixels from the display item to be merged to right padding, and right padding of multiples of 4 pixels.

Each of the display items are preferably aligned relative to 4 pixel boundaries within the target area. Data associated with a display item to be merged may be shifted into a position within the target area that facilitates merging.

According to another embodiment, tokens are produced using the encoded data associated with the display items to be merged. Merging the display items involves merging the display items using the tokens. The tokens represent counts of repeated data or pointers to pass-thru data associated with the display items to be merged.

The display items are prioritized to define an arrangement of overlaying display items and underlying display items, and the tokens are modified into smaller tokens by underlying display items depending on tokens found in an overlaying item. The tokens are produced by decoding the encoded data associated with the display items to be merged. The tokens associated with the target item are later re-compressed into the encoded format.

According to a further embodiment of the present invention, a system for merging display items in an encoded format includes a memory defining a target item having a target area and configured to store a number of display items to be merged in the encoded format. A processor is coupled to the memory. The processor examines the display items on the basis of item priority and merges the display items in the target area according to item priority to produce the target item. The processor and memory cooperate to implement other processes of the compress/merging methodology of the present invention, such as those processes discussed above.

In accordance with yet another embodiment, an information bearing medium includes processor-readable instructions for merging display items in an encoded format. The processor-readable instructions cause a processor to perform the steps of: providing, in the encoded format, a number of display items to be merged; examining the display items on the basis of item priority; defining a target item having a target area; and merging the display items in the target area according to item priority to produce the target item. The processor-readable instructions cause a processor to perform other steps, including those discussed previously.

The above summary of the present invention is not intended to describe each embodiment or every implementation of the present invention. Advantages and attainments, together with a more complete understanding of the invention, will become apparent and appreciated by referring to the following detailed description and claims taken in conjunction with the accompanying drawings.

BRIEF DESCRIPTION OF THE DRAWINGS

FIG. 2 illustrates an example of the component objects of a bi-level display item in accordance with an embodiment of the present invention;

FIGS. 4A–4F illustrate various aspects of a merge between two items, which may be objects, in accordance with an embodiment of the present invention;

FIG. 9 is a flow diagram showing various steps involved in a Get_Token procedure in accordance with an embodiment of the present invention.

Figure 1:
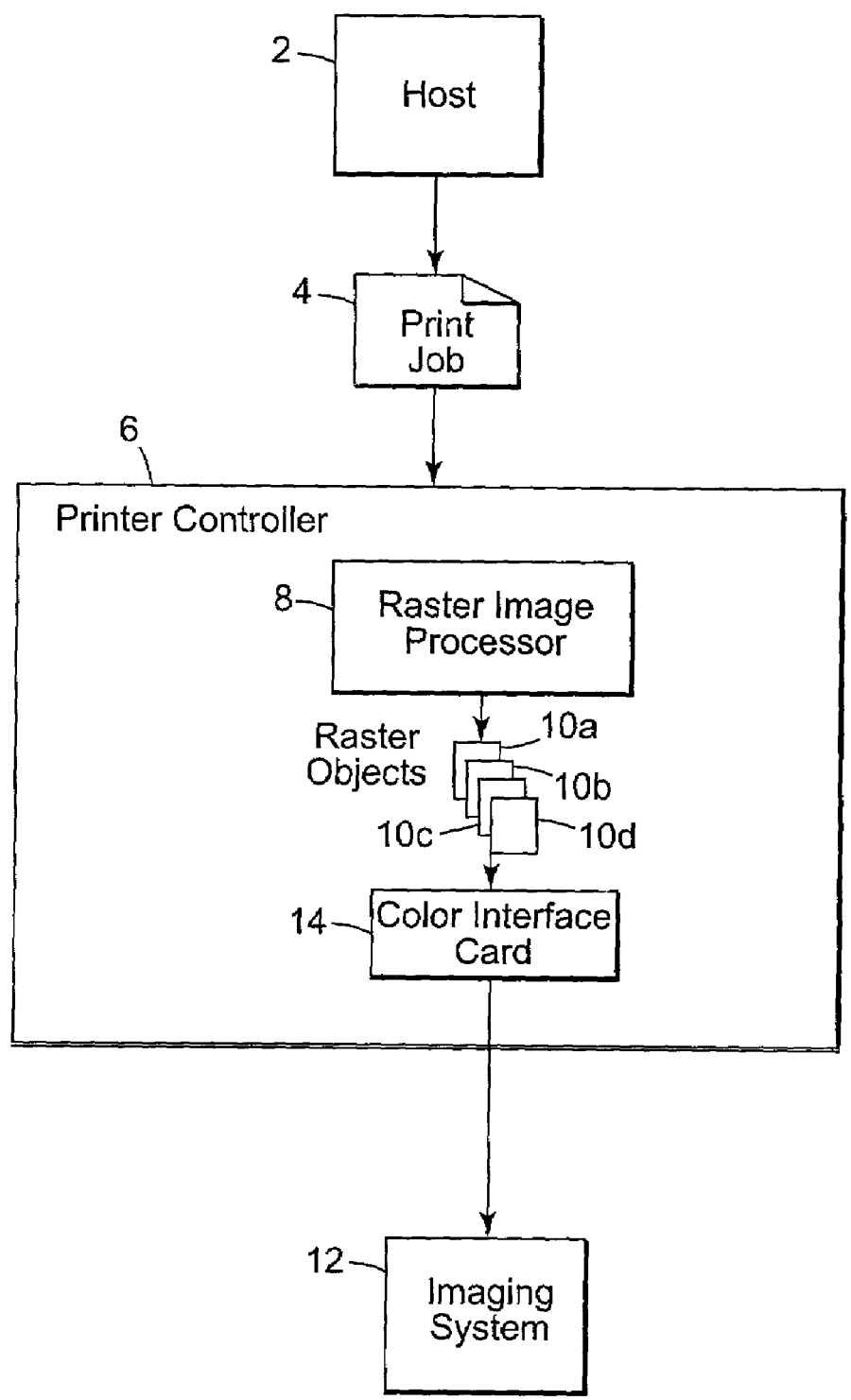
FIG. 1 shows a printing environment in which illustrative embodiments of the present invention are implemented.

While the invention is amenable to various modifications and alternative forms, specifics thereof have been shown by way of example in the drawings and will be described in detail hereinbelow. It is to be understood, however, that the intention is not to limit the invention to the particular embodiments described.

DETAILED DESCRIPTION OF VARIOUS EMBODIMENTS

In the following description of the illustrated embodiments, references are made to the accompanying drawings which form a part hereof, and in which is shown by way of illustration, various embodiments in which the invention may be practiced. It is to be understood that other embodiments may be utilized, and structural and functional changes may be made without departing from the scope of the present invention.

A system and methodology in accordance with the principles of the present invention provide for optimized merging of compressed objects over prior art approaches, which reduces the amount of data to be processed and increases data processing speed. Other advantages include minimizing data transfer time between a raster image processor and a color interface card (CIC card). A data compression/merging approach consistent with the principles of the present invention provides for improved throughput when handling complex color data in microcode, which is particularly advantageous when manipulating the data of merged objects.

According to an embodiment of the present invention, a CIC card is configured to handle a maximum of 4 objects per scan line. A compression/item merging approach of the present invention provides a method to merge special run length encoded data used by the CIC card without converting the data into a raster format. This allows efficient objects to be created when there is no need for merging, and then provides for merging of data when the need arises at a later time. By keeping the data in a compressed format, less data is handled and speed is optimized.

In another embodiment of the present invention, a system and method are provided for decoding a particular form of run length coding, referred to herein as Modified Enhanced Run Length Encoding (MERLE encoding), into tokens. An exemplary form of MERLE encoding which may be employed in the context of the present invention is disclosed in "Color Image Data and Control Bit Compression Scheme with Run Length Encoding," which is incorporated herein by reference as provided hereinabove.

In accordance with this embodiment, the tokens produced from decoded MERLE encoded data are counts of repeated data or pointers to pass-thru data. In operation, original tokens are modified into smaller tokens by underlying objects depending on tokens found in the overlaying object. Objects being merged may contain up to five ranges within the target merged object: left padding of multiples of 4 pixels, transition across 4 pixels from pad to object, mid-object pixels (consisting of multiples of 4 pixels), transition across 4 pixels from object to right padding, and right padding of multiples of 4 pixels.

Pre-merged objects may be positioned anywhere relative to 4 pixel boundaries, since MERLE encoding, in a particular embodiment, describes 4 pixels at a time. Optimizations are made for merging objects with little or no overlap. Optimizations are also made for shifting data from a pre-merged object into the position needed by the merged resultant object by shifting such data on-the-fly, which provides for enhanced performance.

As will be described in greater detail hereinbelow, special algorithms and look-up tables are used to manipulate MERLE data to start at the top (overlaying) object and only look at underlying objects at positions where the control data of the overlaying object indicates transparency. The resulting merged data, either the original tokens or a tokenized merge buffer, is then re-compressed into MERLE encoded data.

This process may involve merging of traditional run length data, but conventional encoding approaches do not address the end-of-scan and end-of-object repeat codes used in the instant approach. Another approach consistent with the principles of the present invention utilizes transparency control data and merges any number of objects at once, thereby requiring reading of the input data only once and writing of the compressed data only once, which provides for improved performance.

Turning now to the figures, and more particularly to FIG. 1, there is illustrated a printing environment within which systems and methods of the present invention may find particular applicability. In accordance with the illustrative embodiment shown in FIG. 1, a host computer 2 generates a print job 4 that may include picture (contone) and line work (text, graphics) components. The host 2 transmits the print job 4 to a printer controller 6 over a cable or network transmission line. The printer controller 6 may comprise a standalone processor or computer, such as the IBM RS/6000 processor. The printer controller 6 includes a raster image processor 8, which is preferably implemented in the RS/6000 main processor and accompanying firmware.

In one embodiment, the raster image processor 8 generates raster objects 10a, b, c, d including the raster data. Each raster object 10a, b, c, d includes pixel information for one color component of the imaging system 12. For example, if the imaging system 12 prints Cyan (C), Magenta (M), Yellow (Y) and black (K), then one raster object would be associated with each color component for a scan line to print. Further, there may be separate raster objects for line art and contone (e.g., JPEG images), thus providing eight separate raster objects for each color component of a scan line for the line art and contone components of the line. The printer controller 6 and imaging system 12 components may be implemented in the same large scale printer, such as the International Business Machines (IBM) Corporation's INFOPRINT color printers, or with a separate server and standalone printer communicating over a network or attached directly using a serial or parallel port.

As is further shown in FIG. 1, a color interface card (CIC) 14 is coupled to the raster image processor 8. The CIC 14 is preferably implemented on a hardware card, such as a PCI card, using Field Programmable Gate Array (FPGA) logic. The CIC 14 may be inserted in a PCI slot of the backplane of the printer controller 6. The CIC 14 performs further processing of the raster objects 10 before the objects 10 are communicated to the imaging system 12 for printing.

In certain implementations, one CIC 14 is capable of producing print data for two of four color planes. In such a case, two CICs are needed to generate the final raster for an output device which uses all four color planes. In duplex implementations, such as where a printer prints on both sides of a sheet concurrently, four CICs 14 would be used, two for each side of the sheet to concurrently generate raster data for the print heads printing to both sides of the sheet.

Related patent application entitled "Method, System, Program, And Data Structure for Generating Raster Objects", and incorporated by reference above, describes the process for generating the contone and line work raster objects 10a, b, c, d used by the CIC 14 to combine and produce the final print output. The raster image processor 8 encodes the line work and contone objects with header information that enables the CIC 14 logic to combine multiple line work and contone objects per scan line into final print output.

In this way, many of the raster processing operations can be off-loaded to a separate hardware card (e.g., the CIC 14), thereby relieving the raster image processor 8 of many of the processor intensive raster operations. This, in turn, substantially increases the ultimate printer speed and performance because the final raster output data used by the printer (or other output device) is generated faster by offloading many of the raster processing operations to dedicated hardware logic implemented in the CIC 14.

In accordance with an embodiment of the present invention, the CIC 14 includes hardware logic to handle up to four line work and four contone objects per scan line per color, totaling 16 line work and 16 contone objects per scan line. For this reason, if the raster image processor 8 receives input print data objects including more than four contone or line work objects per scan line, then the raster image processor 8 must merge certain objects to conform to the CIC 14 hardware requirements. If the CIC 14 was capable of handling more or less line work or contone objects per scan line, i.e., n objects, then the raster image processor 8 would have to merge input print data objects to ensure that there are no more than n line work or n contone objects per scan line.

The raster image processor 8 can generate contone objects that provide eight bits per pel for contone (CT) color data and line work objects that provide eight bits per pel for the line work (LW) color data. The raster image processor 8 further generates two line work control (LWC) bits for each pixel in the line work object. The line work control (LWC) bits can be encoded with one of three values, namely, select line work (LW), select contone (CT) or transparent values. The select line work (LW) value instructs the CIC 14 to use the pixel data in the line work object over data for the pixel in any other lower-priority line work object or contone object. The select contone (CT) value instructs the CIC 14 to use the pixel data in the highest priority contone (CT) object over data for the pixel in any line work (LW) object.

Another line work control bit value, which represents the transparent value, instructs the CIC 14 to consider the line work control (LWC) bits in the next highest priority line work control object. In other words, the transparent value instructs the CIC 14 to consider the instant pixel to be transparent, and the next lower order line work data should be considered to determine whether that pixel is non-transparent and used. The transparent LWC bit setting effectively provides a control mask which indicates whether color data for a particular pixel should be displayed (is non-transparent) or not displayed (is transparent). As will be described in greater detail hereinbelow, the LWC bits controlling pixel transparency are advantageously manipulated to provide for optimized color compression and item merging in accordance with the principles of the present invention.

For purposes of enhancing an understanding of the present invention, FIG. 2 is provided to illustrate the four color planes specified in the CMYK color scheme which may be combined to define the color of a display item, such as a bi-level display item. In general terms, a display item includes a bit map of data indicating what to display for pixels on one or more scan lines. The raster image processor 8 would further generate a set of properties for each line work and contone display item, indicating the display item size, position information for the color data on the sheet, and a control mask.

As discussed previously, a control mask is used to indicate whether color data for a particular pixel in the display item should be displayed (is non-transparent) or not displayed (is transparent). Display item types include solid rectangles, bi-level bitmaps, paletted bitmaps, JPEG image, etc. A solid rectangle display item, for example, would include CMYK color data, height and width data and position data on the sheet for the solid shape.

A bi-level display item, such as one comprising text, bi-level images or bar code for example, has only a single color. A bi-level display item includes four one byte color objects for each of the four color planes CMYK and a line work mask. The combination of the colors for each of the four color planes specified in the CMYK color objects together define the color of the bi-level display item. The line work mask comprises a bit value for each pixel of the bi-level image area. An "on" value indicates that the bi-level image provides color for that pixel corresponding to the "on" value (non-transparent data). An "off" mask value indicates that the color data is not to be used for the pixel (transparent).

FIG. 2 provides an example of the component objects of a bi-level display item for the text string "a b c." Line work objects 152, 154, 156, and 158 each provide a one byte color value for one of C, M, Y and K and a line work mask 150. The white part of the line work mask 150 represents the non-transparent pixels for which the color defined by the CMYK objects 152–158 is used. The black areas of the line work mask 150 represent the transparent portions for which the color data is not used. Thus, the letters appear through the non-transparent pixels indicated in the control mask.

Figure 3:
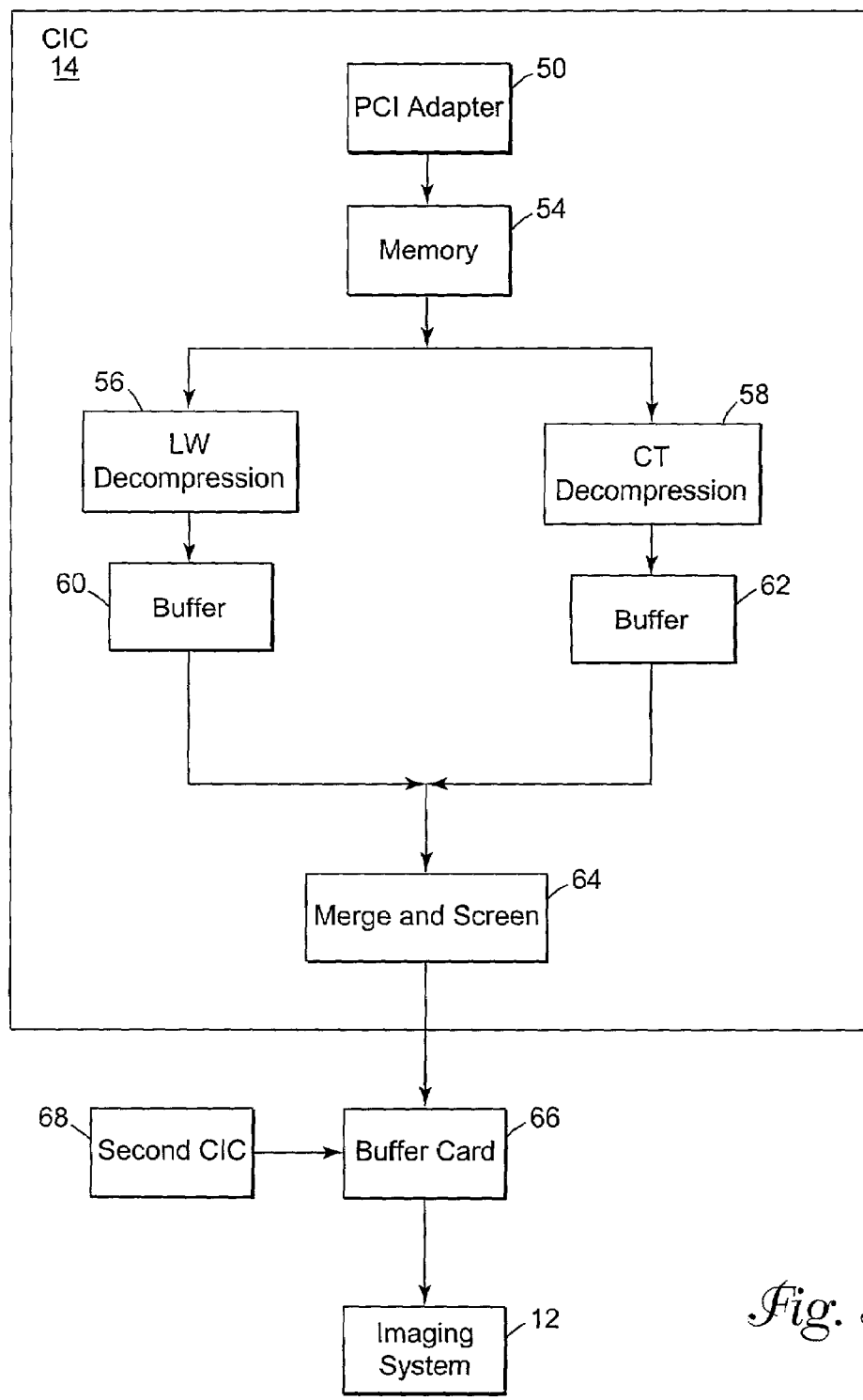
FIG. 3 illustrates hardware architecture implemented in a card that processes compressed color data according to an embodiment of the present invention.

Referring now to FIG. 3, there is shown in greater detail various elements of a CIC 14 which cooperates with the raster image processor 8 of the printer controller shown in FIG. 1. The CIC 14 hardware retrieves the generated raster objects 10*a, b, c, d*, i.e., line work and contone objects, from the raster image processor 8 memory to generate final raster output for the imaging system 12. FIG. 3 illustrates an architectural embodiment of the CIC 14 shown in FIG. 1.

The CIC 14 depicted in FIG. 3 includes a peripheral component interconnect (PCI) adaptor 50, which includes logic to retrieve line work and contone objects from the raster image processor 8. Memory 54 buffers and stores the retrieved line work and contone objects and their headers. The memory 54 may comprise one or more memory cards for storing the header data, line work (LW) objects, contone (CT) objects, and line work control (LWC) objects. The line work (LW) decompression logic 56 decompresses line work and line work control (LWC) objects, and the contone (CT) decompression logic 58 decompresses contone objects. The decompressor logic 56 and 58 writes the decompressed data into buffers 60 and 62, respectively.

The merge and screen logic 64 accesses a byte of contone data from the contone (CT) buffer 62 and a byte of line work data from the line work buffer 60. Based on the value of the line work control (LWC) bits, i.e., line work select or contone select, the merge component of the logic 64 would merge the data into a single byte of data, from either the line work or contone data, and pass the merged data to the screening algorithm. Depending on the type of data, i.e., contone or line work, the screening logic would screen the data to provide the proper color intensity, and then write the data to the buffer card 66, which also receives pel data for two other color planes from a second CIC 68. As discussed, in certain implementations, each CIC 14 handles two color planes, thus requiring two cards for all four CMYK color planes.

In one illustrative embodiment, an object, defined by the pixel data, may be a rectangle having multiple bytes per scan line. The pixel data for the rectangle may be evaluated one scan line at a time to determine if the pixel data, and more particularly to the pixel color data, is to be compressed. If consecutive pixel color data is identified to be same, the consecutive pixel data may be represented in a compressed format to provide the same pixel color data information in a reduced space. In one embodiment, the compressed object represented by a data stream is assumed to have a scan length that is a multiple of 4 pixels (32 bits).

It should be noted that the methodology of the present invention is not limited to the evaluation of pixel data one scan line at a time. On the contrary, and in accordance with one embodiment, the scan line boundaries may be ignored in order to provide enhanced compression/merging. For example, a rectangle may have a width significantly less than the maximum run. As such, it may be more efficient to compress a series of identical scan line runs with a single run which encompasses those scan lines, rather than as a series of end of scan (EOS) codes, one per scan line. By way of further example, it may be desirable to employ a color compression methodology that utilizes a single run which encompasses a series of identical scan lines based on end of object (EOO) or end of block (EOB) codes (e.g., the remainder of the current scan line and all the remaining scan lines of the object or block).

In accordance with the principles of the present invention, the line work control (LWC) bits of the CIC 14 are advantageously manipulated by the raster image processor 8 to implement a compression/merging methodology of the present invention. In broad and general terms, the line work control (LWC) bits of the CIC 14 may be used to declare a segment of a display area as transparent. Normally, this LWC bit setting allows background pixels of an overlaying object (e.g., a font character) to allow an underlying object (e.g., another font character) to show behind the top object.

The line work control (LWC) bits must be set to indicate which pixels are not part of the stroked lines that make up the character. The line work control (LWC) bits for the pixels which are not part of the stroked lines that make up the character are set to a transparent setting. After the line work control (LWC) bits have been set to define the line work in the pixel data, the color data of each of the pixels within the entire bitmap area may be set to a desired color. The desired color is typically one that optimizes color data compression.

In one illustrative example, it may be assumed that each pixel is defined to include eight bits of color data and two bits of line work control (LWC) data. It is further assumed that four color planes are used in accordance with the CMYK color scheme (e.g., 32-bit full color, 4 planes with 8-bit bitmaps). By judiciously manipulating the 2-bit line work control (LWC) bits between transparent and non-transparent states depending on the line work in the data that describes, for example, a character, compression of color data may be enhanced.

The raster image processor 8 may generate compressed color data that is further enhanced using the run length encoding schemes disclosed in the related application entitled "Color Image Data and Control Bit Compression Scheme with Run Length Encoding," which is incorporated herein by reference as provided above. The raster image processor 8 may also generate compressed color data that is further enhanced using the scheme disclosed in the related application entitle "System and Method for Optimizing Color Compression Using Transparency Control Bits," which is incorporated herein by reference as provided above.

As was discussed previously, MERLE is a compression technique decoded by the CIC 14. The present invention decodes MERLE encoding into tokens, which are counts of repeated data or pointers to pass-thru data. According to one embodiment, MERLE employs a single byte control word and then variable length data described by the control word. The control word format (in bits) is denoted as MCCCCCCC, where CCCCCCC is a count and M indicates a mode. The following commands in Table 1 below are provided:

TABLE 1

| M | CCCCCCC | Meaning |
|---|---------|---------|
| 1 | Non-0 | Repeat the following byte 4*CCCCCCC times. The data byte may therefore be repeated 4, 8, 12, 16 . . . 508 times. For 2 bpp compression, the byte is repeated 1, 2, 3 . . . 127 times (up to 508 pixels). |
| 1 | 0 | End Of Scan (EOS) code. Repeat the following byte to the end of the scan line. |
| 0 | Non-0 | Pass the next 4*CCCCCCC bytes "as is." There are 4, 8, 12, 16 . . . 508 possible bytes of data that are not compressed. For 2 bpp compression, there are 1, 2, 3 . . . 127 bytes of data not compressed (up to 508 pixels). |
| 0 | 0 | End Of Object (EOO) code. Repeat the following byte to the end of the object (remainder of this scan and all the remaining scans). |

The MERLE compression algorithm uses a 1 bit per pixel mask to optimize the compressed data. The mask can be expanded to 8 bits per value and suppresses unused color data. It is also used to determine the first used pixel in a group of four pixels, referred to herein as a quad, being compressed. This pixel value is replicated to all four positions of the quad and is masked with the expanded mask from above. If the masked quad of input values matches the masked value of the replicated quad, then the quad contains repeatable data. If there is no match, the input quad is compressed as pass-thru data.

The pass-thru data can be immediately output, since there is no other decision that can be made on the data. However, the repeated data can have three outcomes. The repeated data can either 1) match the previous repeated data value, 2) mismatch the previous repeated data value or start a new string of repeated data, or 3) be entirely non-committal, where no values in the quad are used by the mask.

Two counters are maintained, one for the previous quad value (along with that value) and another for the number of uncommitted quads encountered since the last quad of the previous value. For case 1, the number of quads is counted. For case 2, the current quad count (if any) is used to determine the output to that point, and then a new quad count is started for the new value. For case 3, the number of uncommitted quads is kept along with the count and value of the previous repeated data (if any).

If a case 1 occurs after case 3 that quad and all the uncommitted quads are added to the count for the previous value, leaving nothing in the uncommitted quad count. In other words, the uncommitted quads have become the value of the quads on both sides of them. If a case 2 occurs after case 3 the optimal number of previous values is generated by using the uncommitted count along with the previous value's quad count. The remaining uncommitted values (if any) now become the quad count for the new value.

The optimal value when case 2 follows a case 3 is chosen by extending the previous value as far as possible without running out of counts. As values are output, the counters are decremented, using first the previous value counter and then the uncommitted counter. The first priority is to use the End of Scan Repeat as long as the end of scan is greater than 127 quads away and the total of both counters equal or exceeds the number of quads to the end of the scan line. Otherwise, repeats of 127 quads are used while the total of both counters allow it.

Finally, if the previous quad value's counter is still not decremented to zero, the total number left is used for the previous value. Now both counters are zero, and the next value is used from here onward. However, if the previous value's counter had decremented to zero, then the uncommitted quads are moved into the previous value's counter and the previous value is changed to reflect the new value. This determines where the switch occurs optimally between the previous and new values when some number of uncommitted values exists. When the object ends, residual non-zero values in either of the counters indicates the previous value can be repeated to the end of the object.

Another optimization for a certain form of MERLE, referred to as MERLE-8 (8 bit), that may be employed depending on the processor characteristics is the alignment of pass-thru data. Some processors are more efficient when writing words (quads) on word boundaries. When passing through large amounts of data, it may increase performance to write one byte at a time until the quads are aligned on word boundaries. In some configurations, this might remove several extra memory cycles or processor cycles to read and write the cache.

According to another form of MERLE, referred to as MERLE-2 (2 bit), the compression is quite similar, except the quads now appear in a byte instead of a word, so the mask is expanded to only 2 bits per value. Also, data writes are now byte oriented, so there may be some internal buffering to optimally generate full words of output. Other similar definitions of compression algorithms may be used which allow groupings of more or less than 4 pixels (i.e., n pixels) and be codified in a similar manner.

Merging occurs when the hardware limit of four objects per scan line is exceeded or when saving or caching an object (to get one object per scan line in order to reduce run-time merging that may be needed later). In the merging process, the set of objects and the choice of list items to be merged has already been decided. A non-exhaustive set of list items include: solid rectangle; bi-level, palette (8-bit), 32 bit full color (4 planes with 8-bit bitmaps); 24 bit full color (3 planes with 8-bit bitmaps); 4 bit full color (4 planes with bi-level bitmaps); JPEG image; CT Line Work shadow (CT data in a line work placeholder); LW Proxy (pseudo line work item that refers to one or more real line work items); CT Proxy (pseudo continuous tone item that refers to one or more real continuous tone items); and hardware-ready (HW) items (items in a hardware (e.g., CIC) useable format).

The merge code knows the size of the resultant object and the set of list items being merged. This set is ordered by priority, from highest to lowest. An interface structure is created for each list item so that the list item can be asked to provide its own data without losing track of its current position. The interface state is separate from the list item to allow multiple threads to interact simultaneously with the list items to create merged objects for each color channel.

The masks are examined across this entire range of objects to be merged, from the highest priority object in the range to the lowest (until the mask precludes more objects). The mask determines which pixels are required from the object. As the mask is examined, a determination is made whether a lower priority object shows through due to transparent pixels. After each object, the master mask is adjusted to prevent lower priority objects from overwriting any previously written pixels. Therefore, only one used pixel is written into the scan line segment at any given position.

Turning now to FIGS. 4–10, there is illustrated various block diagrams, flow diagrams, and charts directed to various embodiments of the present invention. FIG. 4 is illustrative of a conceptual merge between two items, which may be objects, identified as Item #1 and Item #2. FIGS. 4A and 4B illustrate Items #1 and #2 in a MERLE compressed form. FIG. 4A depicts the control data and color data of Item #1, which includes a repeat to end-of-scan (EOS) code. FIG. 4B depicts the control data and color data of Item #2, which includes a repeat to end-of-block (EOB) code. FIGS. 4C and 4D show Items #1 and #2 in a rasterized, uncompressed form. FIG. 4E shows the logical merging of Items #1 and #2 in a rasterized, uncompressed form. FIG. 4F shows a merged target item or object in a MERLE compressed form. The raster phase is not used in FIG. 4F, since the merge works directly on the MERLE compressed data of each of Items #1 and #2.

In FIGS. 4A–4F, repeat data is designated by a capital R, and pass-thru data is designated by a capital P. As was discussed previously, the line work control bits can be encoded with one of three values as follows: 01 selects line work (LW); 10 selects contone (CT); and 00 selects transparent values. Control bit combination 11 is reserved. For example, the select line work (LW) control bit code 01 instructs the CIC 14 to use the pixel data in the line work object over data for the pixel in any other line work object or contone object. The select contone (CT) control bit code 10 instructs the CIC 14 to use the pixel data in the highest priority contone (CT) object over data for the pixel in any line work (LW) object. In FIGS. 4C–4E, a dot in the control data refers to a select line work (LW) code, and the absence of a dot refers to a select transparency code.

FIGS. 5A–5C, 6A–6C, and 9A–9B are flow diagrams depicting various process steps associated with merge operations illustrated in FIGS. 4A–4F. These flow diagrams depict several merge processes, including skipping, Fetch_Data, Get_Token, and data outputting processes. The Get_Token process returns meta-data describing a scan line. Get_Token returns the number of repeats or the number of pass-thru bytes, and their location. A pass-thru count points to a contiguous string of bytes. Alternatively, the pass-thru count may be broken up and returned piece meal. The count returned is limited by the number of pixels left in the current scan line of the original non-compressed item. Get_Token always returns multiples of 4 control pixels, or any number of color data pixels.

The Fetch_Data process realigns pixels from Get_Token to the target boundaries. Fetch_Data may have to recombine pixels, since Get_Token may return any number of pixels. Fetch_Data always returns multiples of 4 pixels.

Skipping is done because the lower priority levels are not used when the higher levels are non-transparent. The higher level(s) move along relative to the current position. When the lower level is again accessed, skipping ahead to the current position occurs. All the data up to the current position is discarded, since this data will not be used.

When the main merge code "outputs" data, it does so according to the methodology described in "System and Method for Optimizing Color Compression Using Transparency Control Bits," which is incorporated herein by reference as provided above. In particular, the merge code outputs data by maintaining repeat and arbitrary counts and comparing data to determine if it is repeated. Thus, the output data is not immediately output, but is subject to further compression. Output of tokens may be accomplished by adding large repeat amounts to the repeated or arbitrary counters.

Figure 5A:
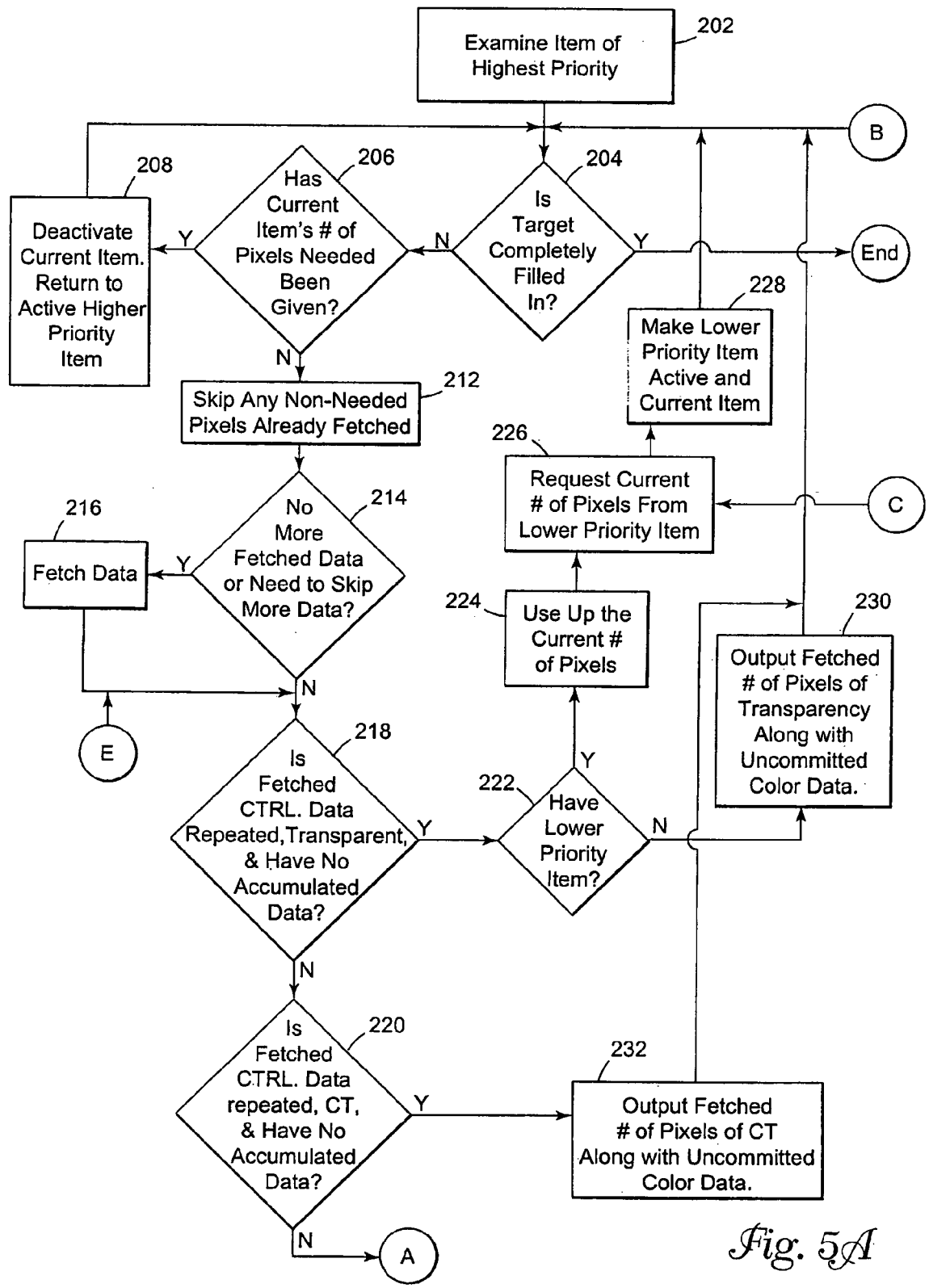
FIGS. 5A–5C are flow diagrams depicting various process steps associated with merge operations illustrated in FIGS. 4A–4F in accordance with an embodiment of the present invention.
Figure 5B:
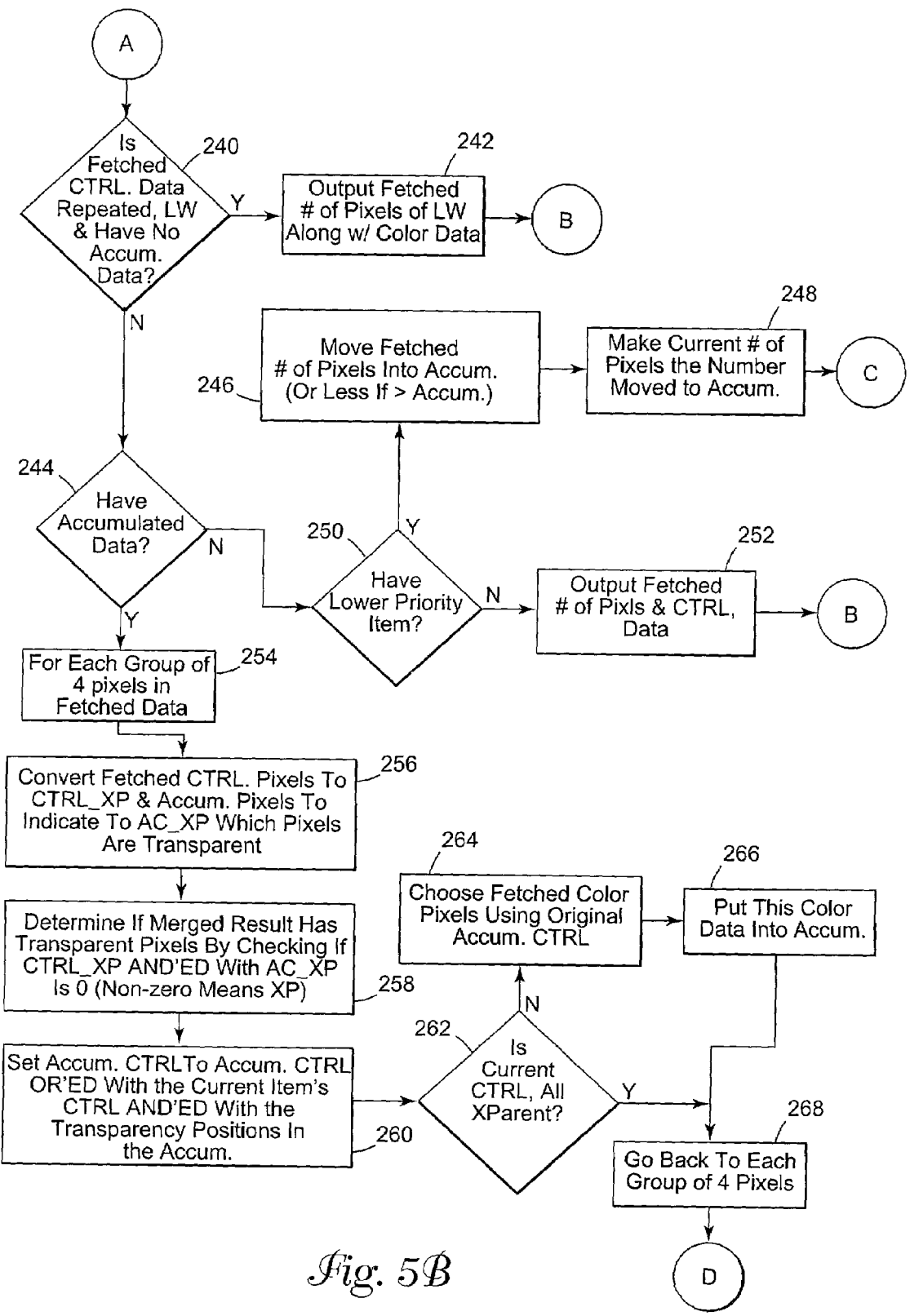
Figure 8:
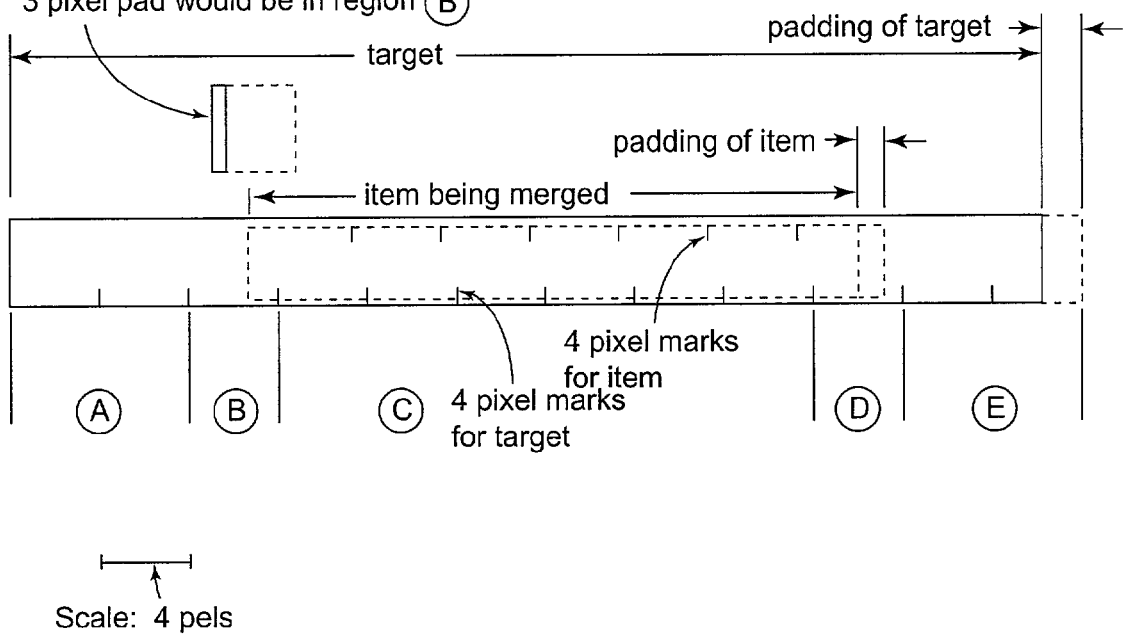
FIG. 8 is a depiction of item position within a target (merged) scan line in accordance with an embodiment of the present invention.

Referring once again to FIG. 5, the processes of the flow diagram of FIG. 5A examine which of Items #1 and #2 is of highest priority and use data fetch operations to completely fill in a target item or object. A target, as best shown in FIG. 8, refers to the area that extends from the leftmost pixel of the leftmost item to the rightmost pixel of the rightmost item for the set of items being merged, plus the padding to make a multiple of 4 pixels. The procedure involves the use of a data accumulator which is accessed during the data fetch operations. The steps depicted in FIGS. 5A–5C continue until the target item is completely filled in.

With particular reference to FIG. 5A, the merge algorithm examines 202 the item of highest priority, which is Item #1 in the illustrative embodiment shown in FIG. 4. If the target item is not completely filled in 204, a check is made to determine 206 if the current item's number of pixels needed has been given. If so, the algorithm deactivates the current item and returns 208 to the next-higher priority item which is active. If not, any non-needed pixels already fetched are skipped 212.

If 214 there is no more fetched data or if there is a need to skip more data, the Fetch_Data process is called 216, as will be described below with regard to FIG. 6. If the determination at decision block 214 is negative, a check is made to determine 218 if the fetched control (CTRL) data is repeated (Rn), transparent (control bit code 00), and have no accumulated data in the data accumulator. If so, and there is no lower priority item 222, the fetched number of pixels of transparency is outputted along with uncommitted color data 230, and processing returns to decision block 204. If there is a lower priority item 222, the algorithm uses up 224 the current number of pixels, requests 226 the current number of pixels from the lower priority item, and makes 228 the lower priority item active and the current item. Processing is returned to decision block 204. It is noted that in practice, a lower priority item is only considered if it starts at or before the current position and ends after it (looking for an item containing regions B, C, or D at the current position). This avoids examining items that have no effect on the current position to achieve faster performance. This is why items are made active, so that unconsidered items can be skipped when returning to higher priority items 208.

If the determination made at decision block 218 is negative (N), a check is made to determine 220 if the fetched control data is repeated (Rn), continuous tone (control bit code 10), and have no accumulated data. If so, the current number of pixels of continuous tone (CT) is outputted along with uncommitted color data 232. If not, and with reference to FIG. 5B, a check is made to determine 240 if the fetched control data is repeated (Rn), line work (control bit code 01), and have no accumulated data. If so, the current number of pixels of line work (LW) along with color data is outputted 242. Processing is returned to decision block 204.

If the determination made at decision block 240 is negative (N), a check is made to determine 244 if there is accumulated data. If there is no such accumulated data and there is no lower priority item 250, then the fetched number of pixels and control data are outputted 252. Processing is returned to decision block 204. If 250 there is a lower priority item, the fetched number of pixels are moved 246 into the accumulator so as not to exceed the size of the accumulator. It is noted that in practice, data is not moved into the accumulator until a lower priority item is found that must merge with this data. Otherwise, the move of data to the accumulator is postponed until needed or required. The current number of pixels are made 248 equivalent to the number of pixels moved to the accumulator. Processing is returned to block 226 of FIG. 5A.

If the determination made at decision block 244 is affirmative (Y), a number of operations 254–268 are performed for each group of 4 pixels in the fetched data. The fetched control pixels are converted 256 to control-transparent and accumulator pixels (CTRL_XP & Accum.) to indicate to AC_XP which pixels are transparent. A check is made to determine 258 if the merged result has transparent pixels by checking if CTRL_XP, when logically AND'ed with AC_XP, is zero or non-zero. A non-zero result indicates that the merged result has transparent pixels. The algorithm then sets 260 the accumulator control value to the result of accumulator control value logically OR'd with the result of the current item's CTRL logically AND'ed with the transparency positions in the accumulator.

If 262 the current CTRL is all transparent, the processes beginning at block 254 are repeated 268 for the next group of 4 pixels in the fetched data. If 262 the current CTRL is not all transparent, the fetched color pixels are chosen 264 using the original accumulator CTRL. This color data is put 266 into the accumulator, and this process is repeated 268 for the next group of 4 pixels in the fetched data.

Figure 5C:
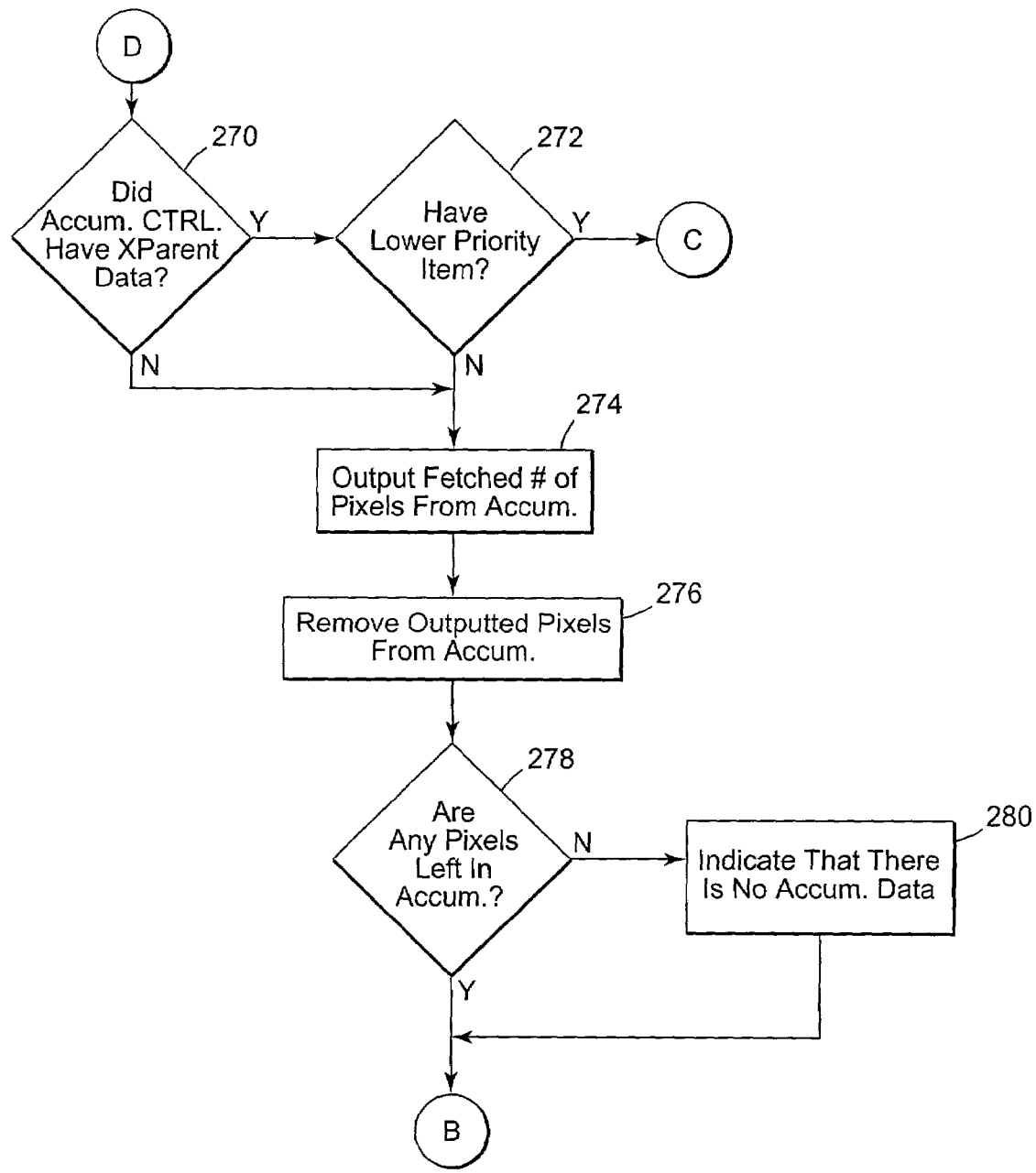

With reference to FIG. 5C, after all groups of 4 pixels in the fetched data have been processed as discussed above, a check is made to determine 270 if accumulator CTRL had transparent data. If so, and there is a lower priority item 272, processing is returned to block 226 of FIG. 5A. If not or there is no lower priority item 272, the number of pixels in the accumulator is outputted 274. The outputted pixels are removed 276 from the accumulator. A check is made to determine 278 if there are any pixels left in the accumulator. If so, processing is returned to decision block 204 of FIG. 5A. If not, the algorithm indicates 280 that there is no accumulator data, and processing is returned to decision block 204 of FIG. 5A.

Figure 6A:
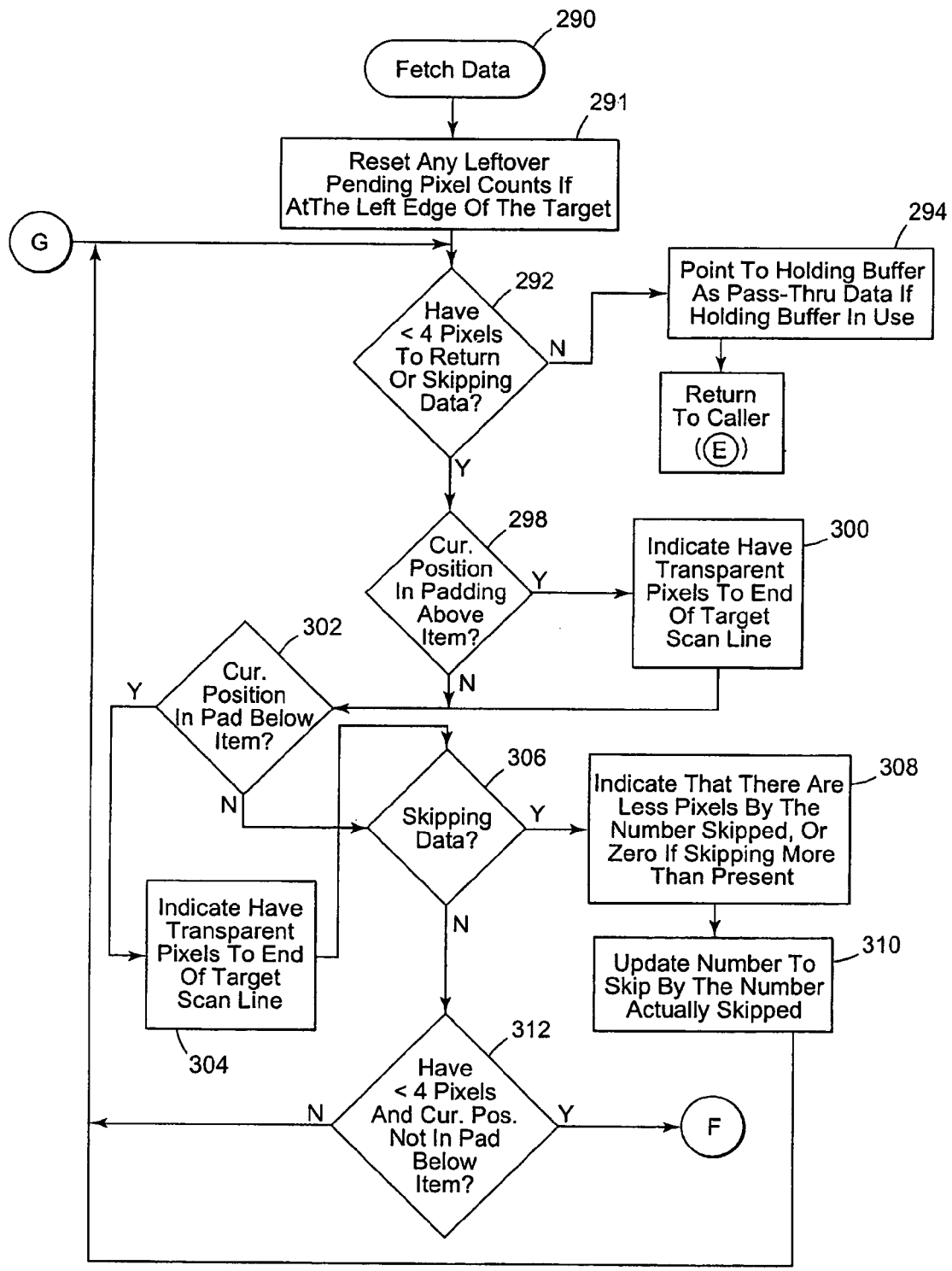
FIGS. 6A–6C are flow diagrams showing various steps involving a data fetch procedure according to an embodiment of the present invention.
Figure 6B:
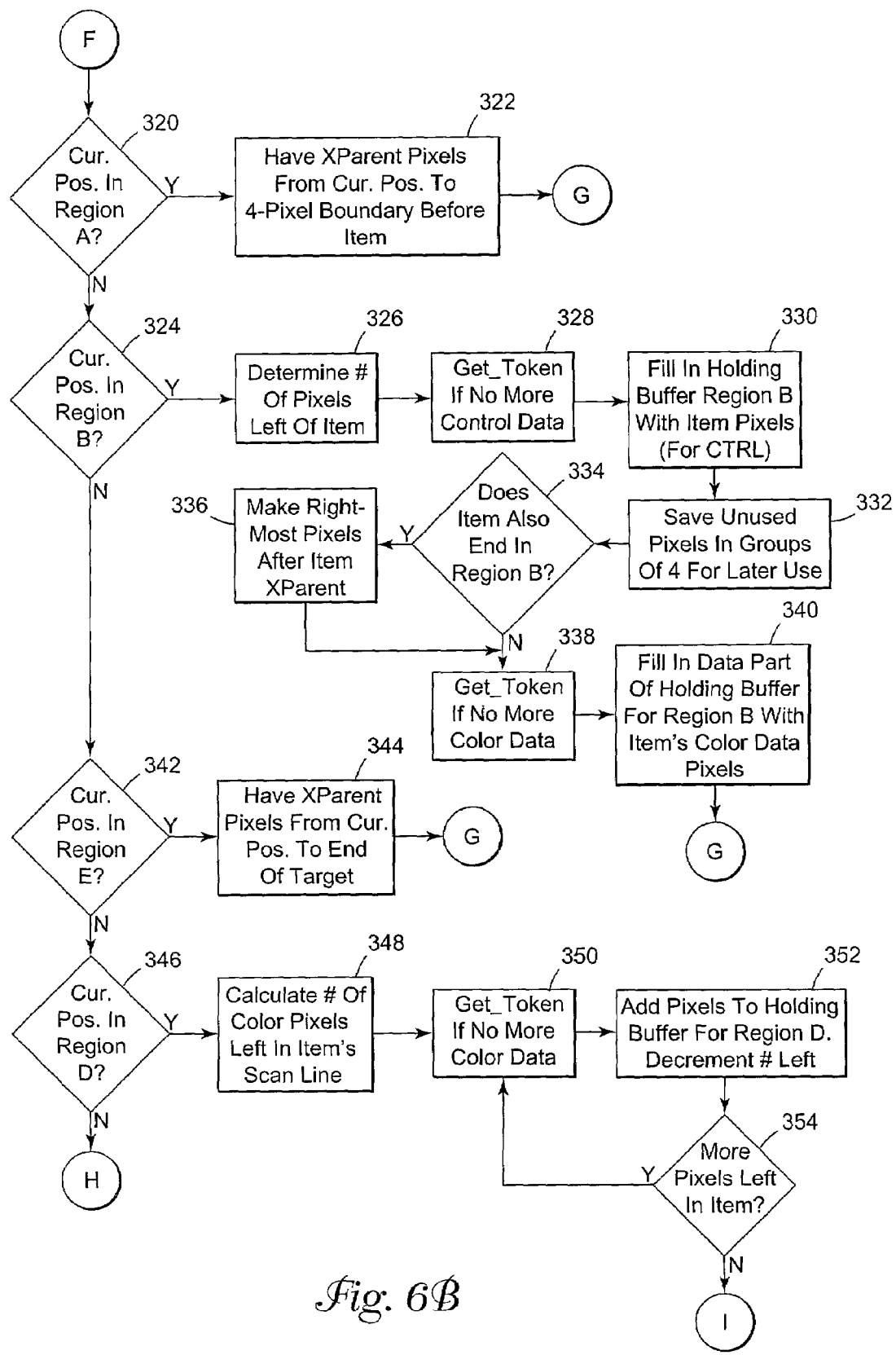
Figure 6C:
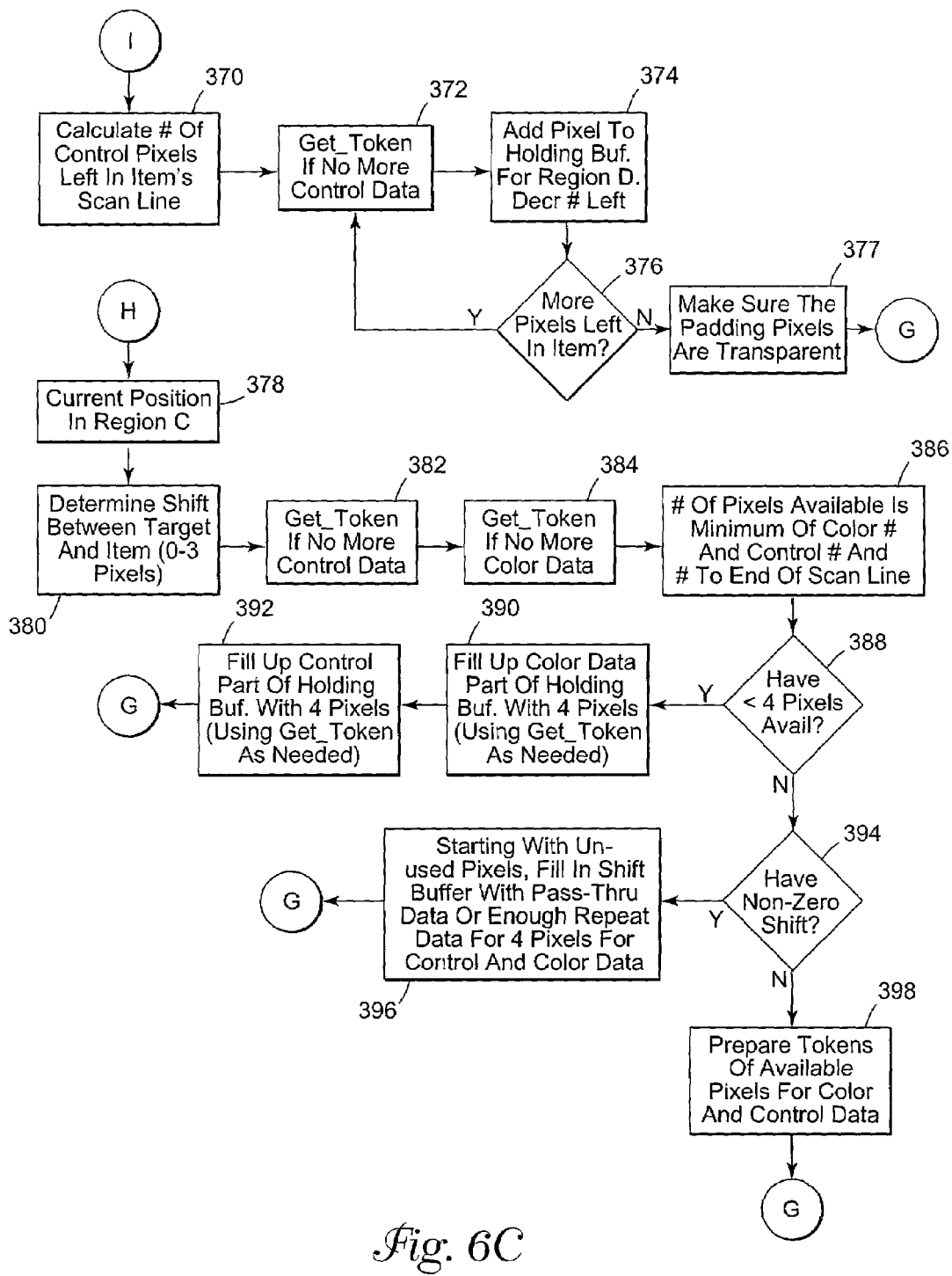

FIGS. 6A–6C are flow diagrams showing various steps involving a fetch procedure according to this embodiment. The fetch procedure, Fetch_Data, is called from the main procedure depicted in FIGS. 5A–5C. The fetch procedure also calls a Get_Token procedure and further prepares tokens of available pixels for color and control data. The processes depicted in FIGS. 6A–6C may be better understood by referring to FIGS. 7 and 8.

Figure 7A:
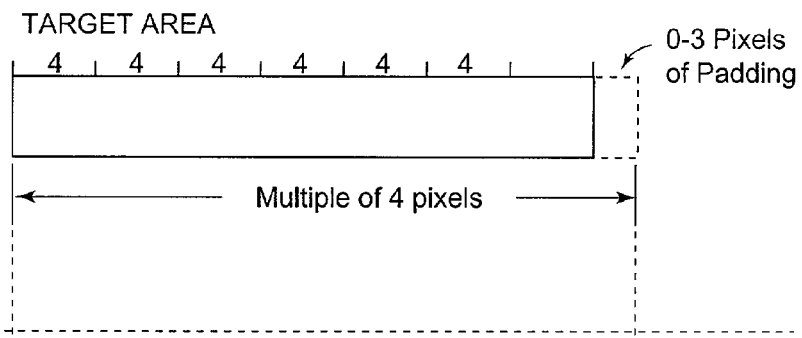
FIG. 7A is an illustration of a target area associated with merge code in accordance with an embodiment of the present invention.
Figure 7B:
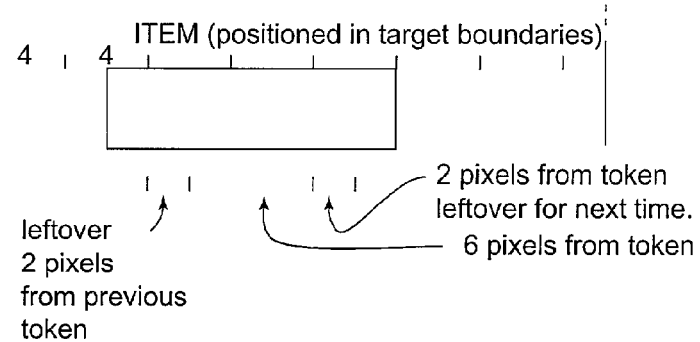
FIG. 7B shows fetch data code associated with a target item positioned at specified target locations in accordance with an embodiment of the present invention.
Figure 7C:
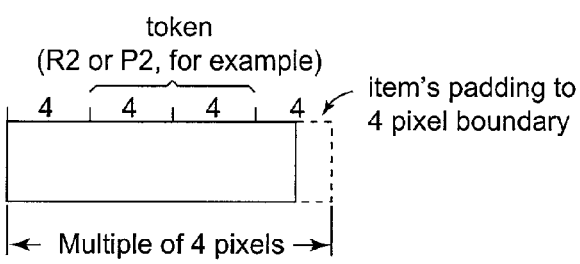
FIG. 7C shows Get_Token function code for an item in accordance with an embodiment of the present invention;.

FIG. 7A is an illustration of a target area associated with merge code. FIG. 7B shows fetch data code associated with a target item positioned in specified target boundaries. The fetch data code, in this embodiment, aligns tokens to 4-pixel boundaries in the target item. FIG. 7C shows Get_Token code for an item. FIG. 8 is a depiction of item position within a target (merged) scan line. In this context, the target refers to the area that extends from the leftmost pixel of the leftmost item to the rightmost pixel of the rightmost item for the set of items being merged, plus the padding to make a multiple of 4 pixels. The target consists of the set of all such scan lines, wherein each scan line is called a target scan line.

As best shown in FIG. 8, the item being merged is located within the target. The target is shown to be made up of several regions, Regions A through E. Region A includes groups of 4 pixels that do not include any of the item. Region B is aligned at a 4 pixel boundary from the start of the target.

The four pixels of Region B include the first pixel(s) of the item. Region C includes pixels entirely within the item, aligned on a 4 pixel boundary from the beginning of the target. Region D includes the last pixels of the item that extend into the transparent pad at the end of this 4 pixel region. The padding pixels of the item itself are not considered. Region E includes completely transparent groups of 4 pixels to the end of the target.

The target marks are aligned on 4 pixel boundaries to facilitate easy merging of different items. Region A exists if the item begins at least 4 pixels from the left edge of the target. Region B exists if the item does not start on a 4 pixel target boundary. Region C exists if the item is wide enough to have pixels in this region. These pixels typically need to be shifted if Region B exists. Region D contains the last 1 to 3 pixels of the item, and does not exist if the item does not have leftover pixels beyond a 4 pixel boundary in the target. The item's pad does not affect the grouping of the returned pixels. Region E exists if there are at least 4 pixels to the right of the item which are in the target (including the target's pad).

Upon calling 290 the fetch data process, any pending unused pixel counts are reset if the current position is at the left edge of the target 291. Then a check is made to determine 292 if there are less than 4 pixels to return or if skipping data. If not, the algorithm points 294 to a holding buffer as pass-thru data if the holding buffer is in use. Otherwise, the fetched pixels are available directly to the caller without the use of the holding buffer. Processing returns to decision block 218 in FIG. 5A. If so, a check is made to determine 298 if the current position is in the padding above the item. If affirmative, an indication is made 300 that there are transparent pixels to the end of target scan line. A check is then made to determine 302 if the current position is in the padding below the item. If affirmative, an indication is made 304 that there are transparent pixels to the end of the target scan line.

If skipping data 306, an indication is made 308 that there are fewer pixels by the number of skipped pixels, or no pixels if skipping more data than is present occurs. The number of pixels to skip is updated 310 by the number actually skipped. Processing is then returned to decision block 292.

If not skipping data 306, a check is made to determine 312 if there are fewer than 4 pixels and the current position is not in the pad below the item. If not, processing is returned to decision block 292 If so, and as shown in FIG. 6B, a check is made to determine 320 if the current position is in Region A of the target area. It is noted that groups of 4 pixels in Region A do not include any of the item in the target area, as is best shown in FIG. 8.

Figure 9A:
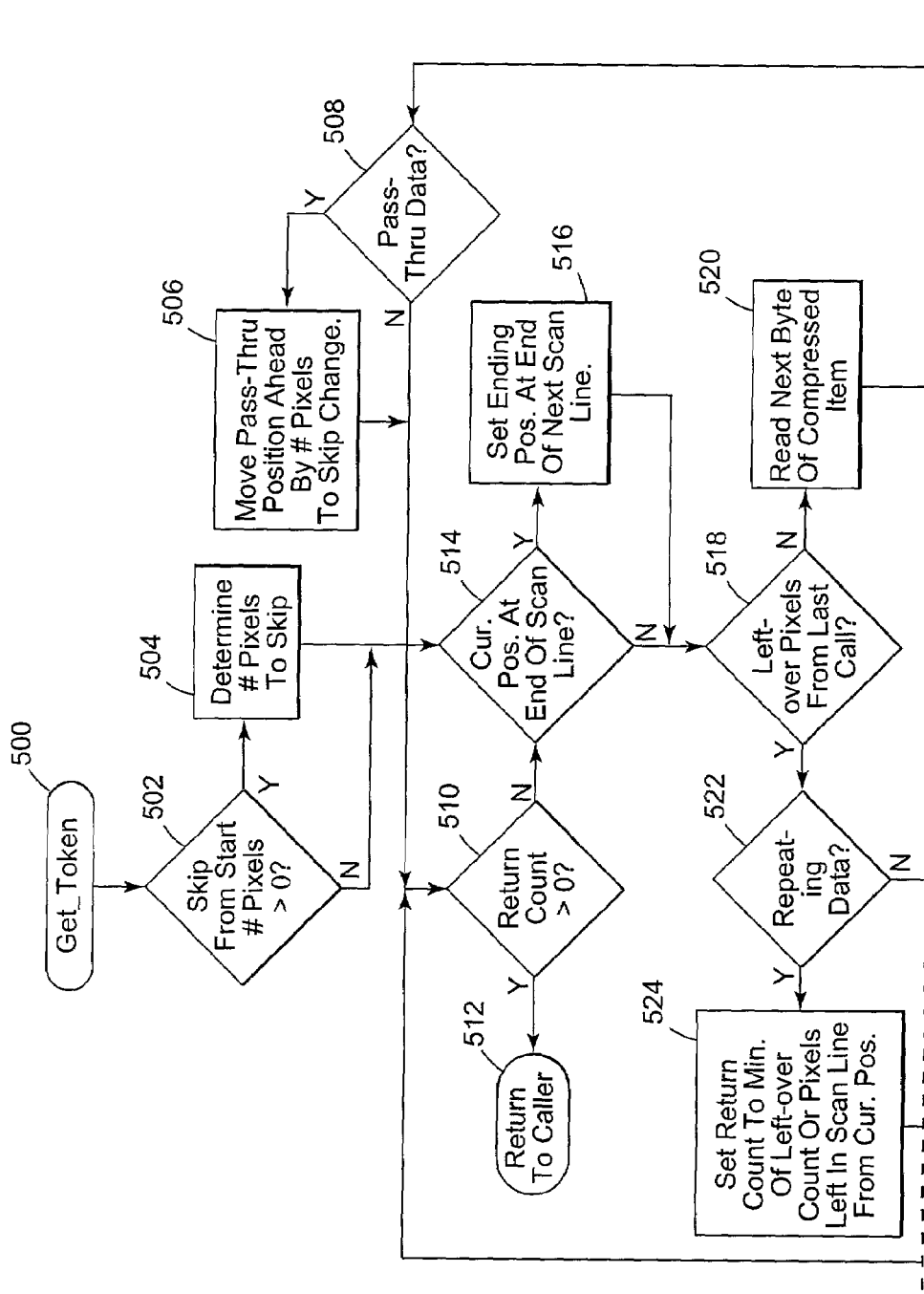
FIGS. 9A and 9B depict several steps of the aforementioned Get_Token process.

If the current position is in Region A, then there are transparent pixels 322 from the current position to the 4 pixel boundary before the item. Processing returns to the fetch data routine at decision block 292 If the current position is not in Region A, the algorithm determines 324 if the current position is in Region B. Region B, as shown in FIG. 8, refers to the area of the target where the item begins, such that the leftmost pixel is not in the item and a pixel to the right includes the item. If the current position is in Region B, the number of pixels to the left of the item is determined 326 The Get_Token procedure, which begins at block 500 in FIG. 9A, is performed 328. The control part of the holding buffer of Region B is filled in 330 with item pixels (for CTRL). The unused pixels are saved 332 in groups of 4 for later use.

A check is made to determine 334 if the item also ends in Region B. If so, the rightmost pixels after the item are made transparent 336. The Get_Token process is performed 338 if there is no more color data. The data part of the holding buffer for Region B is filled in 340 with the item's color data pixels. Processing returns to the fetch data procedure at decision block 292 of FIG. 6A.

If the current position is not in Region B, the algorithm determines 342 if the current position is in Region E. Region E, as shown in FIG. 8, refers to the area of the target that exists after the item and does not include any pixels from the item. Padding of the item, however, may exist in Region E. Region E includes padding of the target. If the current position is in Region E, then there are transparent pixels 344 from the current position to the end of the target. Processing returns to the fetch data procedure at decision block 292 of FIG. 6A.

If the current position is not in Region E, the algorithm determines 346 if the current position is in Region D. Region D, as shown in FIG. 8, refers to the area of the target where the item ends, such that the leftmost pixel includes the item and the rightmost pixel does not include the item. The item's padding is ignored in this case. If the current position is in Region D, the algorithm calculates 348 the number of color pixels left in the item's scan line. The Get_Token process is performed 350 if there is no more color data. The algorithm adds 352 a pixel to the holding buffer for Region D, and then decrements the number of pixels left. If 354 there are more pixels left in the item, processes 350, 352, and 354 are repeated.

When no more color data pixels are left, and as shown in FIG. 6C, the number of control pixels left in the item's scan line is calculated 370. The Get_Token process is performed 372 if there is no more control data. The algorithm adds 374 a pixel to the holding buffer for Region D, and decrements the number of pixels left. If 376 there are more pixels left in the item, processes 372, 374, and 376 are repeated. If 376 there are no more pixels left in the item, the algorithm makes sure 377 that the padding pixels are transparent. Processing returns to the fetch data procedure at decision block 292 of FIG. 6A.

If the current position is not in Region D, and therefore not in Regions A, B or E according to decision blocks 320, 324, 342, and 346 then the algorithm assumes 378 that the current position is in Region C. Region C, as shown in FIG. 8, refers to the area of the target where all pixels include the item. The shift between the target and item (0–3 pixels) is determined 380. The Get_Token process is performed 382 if there is no more control data. The Get_Token process is performed 384 if there is no more color data. At this point 386, the number of pixels available is the minimum of the number of color data pixels, number of control data pixels, and number of pixels to the end of the scan line (EOS).

If 388 there are less than 4 pixels available, the algorithm fills up 390 the color data part of the holding buffer for Region C with 4 pixels, using the Get_Token process to fetch as many of the remaining pixels as needed. The algorithm also fills up 392 the control part of the holding buffer for Region C with 4 pixels, using the Get_Token process to fetch as many of the remaining pixels as needed. Processing returns to the fetch data procedure at decision block 292 of FIG. 6A.

If 388 there are 4 pixels available, the algorithm determines 394 if there is a non-zero shift. A non-zero shift indicates the offset of the start of the item from the start of the target, modulo 4. If so, the algorithm, starting with any currently unused pixels in the shift buffer, fills 396 in the shift buffer with pass-thru data or a sufficient amount of repeat data for 4 pixels for control and color data. Processing returns to the fetch data procedure at decision block 292 of FIG. 6A. If the algorithm determines 394 if there is not a non-zero shift, the algorithm prepares 398 tokens of available pixels for color and control data. Processing returns to the fetch data procedure at decision block 292 of FIG. 6A.

Figure 9B:
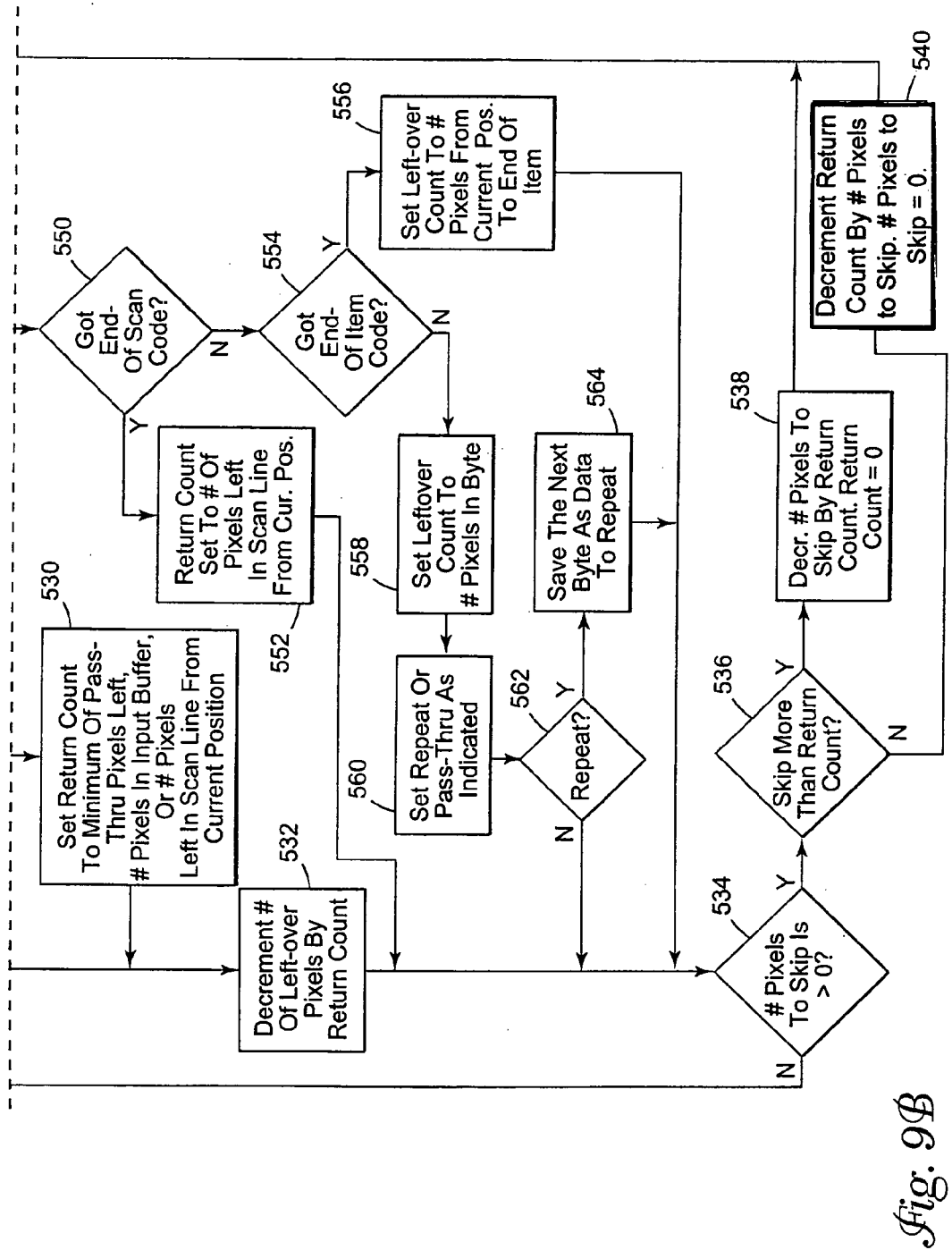

FIGS. 9A and 9B depict several steps of the aforementioned Get_Token process. The Get_Token procedure is called from the fetch procedure, Fetch_Data, depicted in FIGS. 6A–6C. Upon calling 500 the Get_Token process, a check is made to determine 502 whether a skip is requested. If so, the number of pixels to skip is determined 504. Then a check is made to determine 514 if the current position is at the end of the scan line. If so, the algorithm sets 516 the ending position at the end of the next scan line. Then a check is made to determine 518 if there are leftover pixels from the previous call. If so, and there is 522 repeating data, the return count is set 524 to the minimum of the leftover count or the number of pixels left in the scan line relative to the current position. The number of leftover pixels is then decremented 532 by the return count.

The algorithm determines 534 if the number of pixels to skip is greater than zero. If not, processing goes to decision block 510, which determines if the return count is greater than zero. If the return count is not greater than zero, processing continues at decision block 514 in the manner previously described. If the return count is greater than zero, processing 512 returns to the caller of the Get_Token procedure.

If 534 the number of pixels to skip is greater than zero, a check is made to determine 536 if the skip is more than the return count. If so, the number of pixels to skip is decremented 538 by the return count, and the return count is set to zero. If the skip is not more than the return count, the return count is decremented 540 by the number of pixels to skip, and the count of the number of pixels to skip is set to zero.

After processing of blocks 538 and 540, the algorithm determines 508 if there is pass-thru data. If not, processing returns to decision block 510. If so, the pass-thru position is moved 506 ahead by the number of pixels of the skip change. Processing returns to decision block 510.

If, at decision block 518, there are no leftover pixels from the last call, the next byte of the compressed item is read 520. If 550 an end of scan code is encountered, the return count is set 552 to the number of pixels left in the scan line relative to the current position. Processing is returned to decision block 534 in the manner previously described.

If an end of scan code is not encountered, a check is made to determine 554 if an end of item code is encountered. If so, the leftover count is set 556 to the number of pixels from the current position to the end of the item. Processing continues at decision block 534 in the manner previously described. If an end of item code is not encountered, the leftover count is set 558 to the number of pixels indicated in the byte of compressed data. The repeat or pass-thru state is set 560 as indicated from this byte of compressed data. If 562 the repeat state is indicated, the following byte of compressed data is saved 564 as data to repeat. If not, or after block 564 is processed, processing continues at decision block 534 in the manner previously described.

If, at decision block 522, repeating data is not being processed, the return count is set 530 to the minimum of either leftover pixels, the number of pixels left in the current compressed data buffer or the number of pixels left in the scan line from the current position. Processing continues at decision block 534 in the manner previously described.

Figure 10:
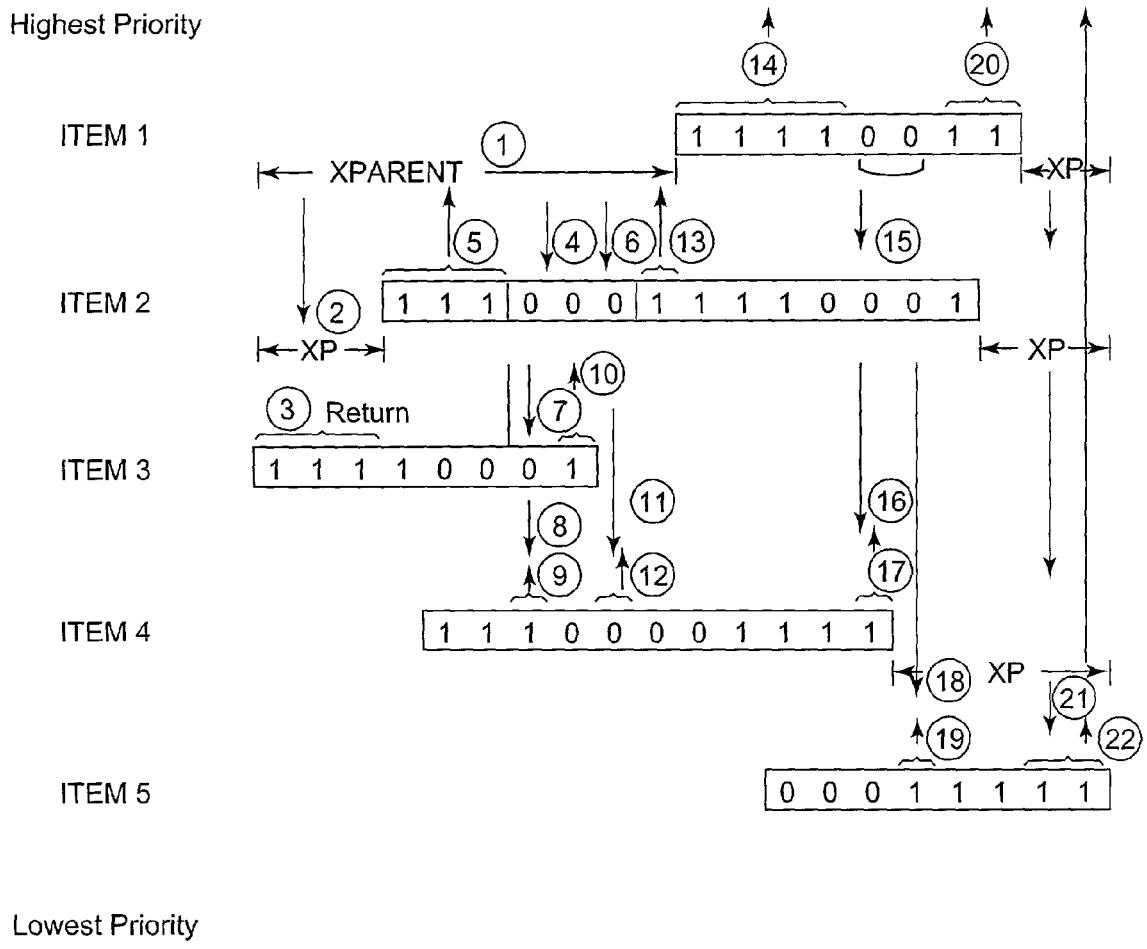
FIG. 10 illustrates a target item or object that results from merging of five items in accordance with the principles of the present invention.

FIG. 10 is a graphical depiction of a merging process involving five items prioritized from highest to lowest priority. Distinct processing steps are identified as circled numbers to indicate the flow of the merging process as between these five items. The resulting target is also shown. The numbers listed in the resulting target represent the particular item showing at a particular location in the resulting target, with the letter x presenting transparency at the indicated location of the resulting target.

Embodiments of the present invention may be implemented as a method, apparatus or information bearing media using standard programming and/or engineering techniques to produce software, firmware, hardware, or any combination thereof. The programs defining the functions of the various embodiments can be delivered to a computer via a variety of information bearing media, which include, but are not limited to, computer-readable devices, carriers, or media, such as a magnetic storage media, "floppy disk," CD-ROM, a file server providing access to the programs via a network transmission line, wireless transmission media, signals propagating through space, radio waves, infrared signals, etc. Of course, those skilled in the art will recognize that many modifications may be made to this configuration without departing from the scope of the present invention. Such information bearing media, when carrying computer-readable instructions that direct the functions of the present invention, represent further embodiments of the present invention.

The foregoing description of the various embodiments of the invention has been presented for the purposes of illustration and description. It is not intended to be exhaustive or to limit the invention to the precise form disclosed. Many modifications and variations are possible in light of the above teaching.

I claim:

1. A method of merging display items in an encoded format, comprising:

providing a plurality of compressed display items to be merged, the compressed display items comprising compressed rasterized line work, contone objects that are to be combine to produce a final merged output for an imaging system;

defining a target item having a target area, the target area being defined by a boundary that extends from a leftmost pixel of a leftmost display item of the plurality of compressed display items to a rightmost pixel of a rightmost display item of the plurality of compressed display items;

decompresssing each of the plurality of compressed display items to form tokens;

assigning each of the plurality of decompressed display items a priority;

examining the decompressed display items based on the assigned item priority;

aligning each of the decompressed display items relative to the n pixel boundaries within the target area;

merging the decompressed display items in the target area to produce the final merged output for an imaging system according to item priority and pixel control data to produce the target item, the target item representative of the merged plurality of display items; and re-compressing the merged display items to produce the final merged output for an imaging system.

2. The method of claim 1, wherein the display items comprises at least some of repeat data, pass-thru data, an end of scan code, and an end of block code.

3. The method of claim 1, wherein examining the display items comprises skipping data at particular locations of lower priority display items when corresponding locations of higher priority display items are non-transparent.

4. The method of claim 1, wherein the decompressed display items being merged comprise up to five ranges within the target area, the five ranges comprising left padding of multiples of n pixels, a transition defined across n pixels from the padding to the display item to be merged, mid-object pixels, a transition defined across n pixels within a target area from the display item to be merged to right padding, and right padding of multiples of n pixels.

5. The method of claim 1, wherein the tokens represent counts of repeated data or pointers to pass-thru data associated with the decompressed display items to be merged.

6. The method of claim 1, wherein the tokenized display items are prioritized to define an arrangement of overlaying display items and underlying display items, wherein the tokens are modified into smaller tokens by underlying display items depending on tokens found in an overlaying item.

7. A system for merging display items in an encoded format, comprising:
   a memory for storing a plurality of compressed display items to be merged, the compressed display items, the memory being further configured to define a target item having a target area, the target area being defined by a boundary that extends from a leftmost pixel of a leftmost compressed display item of the plurality of compressed display items to a rightmost pixel of a rightmost compressed display item of the plurality of compressed display items; and
   a processor, coupled to the memory, for decompresssing each of the plurality of compressed display items to form tokens, assigning each of the plurality of decompressed display items a priority, examining the decompressed display items on the basis of the assigned item priority, aligning each of the decompressed display items relative to the n pixel boundaries within the target area, merging the decompressed display items in the target area to produce the final merged output for an imaging system according to item priority and pixel control data to produce the target item, the target item representative of the merged plurality of display items and re-compressing the merged display items to produce the final merged output for an imaging system.

8. The method of claim 7, wherein the display items comprises at least some of repeat data, pass-thru data, an end of scan code, and an end of block code.

9. The method of claim 7, wherein the processor examines the display items by skipping data at particular locations of lower priority display items when corresponding locations of higher priority display items are non-transparent.

10. The method of claim 7, wherein the decompressed display items being merged comprise up to five ranges within the target area, the five ranges comprising left padding of multiples of n pixels, a transition defined across n pixels from the padding to the display item to be merged, mid-object pixels, a transition defined across n pixels within a target area from the display item to be merged to right padding, and right padding of multiples of n pixels.

11. The method of claim 7, wherein the tokens represent counts of repeated data or pointers to pass-thru data associated with the decompressed display items to be merged.

12. The method of claim 7, wherein the processor prioritized the tokenized display items to define an arrangement of overlaying display items and underlying display items, wherein the tokens are modified into smaller tokens by underlying display items depending on tokens found in an overlaying item.

13. A computer readable medium having encoded thereon computer readable instructions for merging display items in an encoded format, the processor-readable instructions causing a processor to perform operations, comprising:
   providing a plurality of compressed display items to be merged, the compressed display items comprising compressed rasterized line work, contone objects that are to be combine to produce a final merged output for an imaging system;
   defining a target item having a target area, the target area being defined by a boundary that extends from a leftmost pixel of a leftmost display item of the plurality of compressed display items to a rightmost pixel of a rightmost display item of the plurality of compressed display items;
   decompresssing each of the plurality of compressed display items to form tokens;
   assigning each of the plurality of decompressed display items a priority;
   examining the decompressed display items based on the assigned item priority;
   aligning each of the decompressed display items relative to the n pixel boundaries within the target area;
   merging the decompressed display items in the target area to produce the final merged output for an imaging system according to item priority and pixel control data to produce the target item, the target item representative of the merged plurality of display items; and
   re-compressing the merged display items to produce the final merged output for an imaging system.

14. The information bearing medium of claim 13, wherein the display items comprises at least some of repeat data, pass-thru data, an end of scan code, and an end of block code.

15. The information bearing medium of claim 13, wherein examining the display items comprises skipping data at particular locations of lower priority display items when corresponding locations of higher priority display items are non-transparent.

16. The information bearing medium of claim 13, wherein the decompressed display items being merged comprise up to five ranges within the target area, the five ranges comprising left padding of multiples of n pixels, a transition defined across n pixels from the padding to the display item to be merged, mid-object pixels, a transition defined across n pixels within a target area from the display item to be merged to right padding, and right padding of multiples of n pixels.

17. The information bearing medium of claim 13, wherein the tokens represent counts of repeated data or pointers to pass-thru data associated with the decompressed display items to be merged.

18. The information bearing medium of claim 13, wherein the tokenized display items are prioritized to define an arrangement of overlaying display items and underlying display items, wherein the tokens are modified into smaller tokens by underlying display items depending on tokens found in an overlaying item.

* * * * *